(12) United States Patent
Marley et al.

(10) Patent No.: US 12,223,387 B2
(45) Date of Patent: *Feb. 11, 2025

(54) CABLE MANAGEMENT SYSTEM AND METHOD

(71) Applicant: Panduit Corp., Tinley Park, IL (US)

(72) Inventors: Kevin A. Marley, Joliet, IL (US); Brian L. Kelly, Oak Forest, IL (US); Frank J. Graczyk, New Lenox, IL (US); Daniel E. Host, Orland Park, IL (US); Shawn T. Kemp, Crete, IL (US); Andrew J. Stroede, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,918

(22) Filed: Jan. 18, 2024

(65) Prior Publication Data
US 2024/0152714 A1    May 9, 2024

Related U.S. Application Data

(63) Continuation of application No. 17/730,753, filed on Apr. 27, 2022, now Pat. No. 11,915,095, which is a
(Continued)

(51) Int. Cl.
*G06K 7/14* (2006.01)
*H01B 7/36* (2006.01)

(52) U.S. Cl.
CPC ........... *G06K 7/1413* (2013.01); *H01B 7/365* (2013.01)

(58) Field of Classification Search
CPC ............ G06K 7/1413; G06K 7/10683; G06K 7/10891; G06K 7/109; H01B 7/365
(Continued)

(56) References Cited

U.S. PATENT DOCUMENTS 3,197,554 A    7/1965   Baker
5,466,011 A   11/1995   Cohn
(Continued)

FOREIGN PATENT DOCUMENTS

AU    2017101306 A4    11/2017
CN       1917098 A     2/2007
(Continued)

*Primary Examiner* — Edwyn Labaze
(74) *Attorney, Agent, or Firm* — Peter S. Lee; Christopher S. Clancy; James H. Williams

(57) ABSTRACT

A cable management system includes multiple cables, each having a unique identifier associated therewith and each including first and second barcodes including the unique identifier, the first barcode located proximate a first end of the cable, the second barcode located proximate a second end of the cable. The system also includes a barcode scanner to scan barcodes of the cables, the barcode scanner includes a clip to receive one of the cables. The system also includes a mobile computing device having a processor, data storage medium, communication unit, and user interface including a display. The mobile computing device is configured to receive via the user interface first end location information for a first cable, receive from the barcode scanner the first barcode of the first cable, and save and display the first end location information in association with the unique identifier of the first cable included in the first barcode.

20 Claims, 20 Drawing Sheets

Related U.S. Application Data continuation of application No. 17/191,984, filed on Mar. 4, 2021, now Pat. No. 11,347,955.

(60) Provisional application No. 63/056,092, filed on Jul. 24, 2020, provisional application No. 62/986,890, filed on Mar. 9, 2020.

(58) Field of Classification Search
USPC .............................. 235/462.43, 462.01, 375
See application file for complete search history.

(56) References Cited

U.S. PATENT DOCUMENTS

| | | |
|---|---|---|
| 5,704,189 A | 1/1998 | Collier |
| 6,065,728 A | 5/2000 | Spradlin |
| 6,129,796 A | 10/2000 | Steinberg et al. |
| 6,968,994 B1 | 11/2005 | Ashwood Smith |
| 7,229,020 B2 | 6/2007 | Goodison et al. |
| 7,526,582 B2 | 4/2009 | Best et al. |
| 7,656,903 B2 | 2/2010 | Caveney |
| 8,010,999 B2 | 8/2011 | Fujita et al. |
| 8,092,249 B2 | 1/2012 | German et al. |
| 8,117,092 B2 | 2/2012 | Farkas et al. |
| 8,649,651 B2 | 2/2014 | German et al. |
| 9,064,022 B2 | 6/2015 | Smith et al. |
| 9,111,466 B2 | 8/2015 | Dor et al. |
| 9,881,267 B2 | 1/2018 | Adams et al. |
| 9,934,485 B2 | 4/2018 | Barron et al. |
| 10,268,856 B1 | 4/2019 | Jahnke |
| 2007/0221730 A1* | 9/2007 | McReynolds ........ G06Q 10/087 235/451 |
| 2008/0172722 A1 | 7/2008 | Fujita et al. |
| 2008/0199134 A1 | 8/2008 | Cook |
| 2008/0237331 A1 | 10/2008 | Hammer |
| 2008/0318465 A1* | 12/2008 | Johnsen .................. G06F 11/30 439/488 |
| 2009/0100298 A1 | 4/2009 | Lange et al. |
| 2009/0166404 A1 | 7/2009 | German et al. |
| 2009/0195384 A1 | 8/2009 | Amidi |
| 2009/0272794 A1 | 11/2009 | Lange et al. |
| 2011/0025468 A1 | 2/2011 | Longhurst et al. |
| 2013/0181816 A1 | 7/2013 | Carlson, Jr. et al. |
| 2014/0201260 A1 | 7/2014 | Dor et al. |

FOREIGN PATENT DOCUMENTS

| | | |
|---|---|---|
| CN | 206178853 U | 5/2017 |
| JP | 2006127896 A | 5/2006 |
| JP | 2006271154 A | 10/2006 |
| WO | 2010112207 A1 | 10/2010 |
| WO | 2019017763 A1 | 1/2019 |
| WO | 2019133021 A1 | 7/2019 |

* cited by examiner

| Panel Name | | | Mode | Verify | Clear | Save | Recall | Export |
|---|---|---|---|---|---|---|---|---|
| Panel A | | | | | | | | |

Scanning Port
08

| Cabel ID | | | | | |
|---|---|---|---|---|---|
| NE Port | NE ID | Exp NE ID | FE Port | FE ID | |
| PanelA-01 | 10000062 | | PanelB-05 | 10000062 | |
| PanelA-02 | 10000004 | | PanelB-04 | 10000004 | |
| PanelA-03 | 10000002 | | PanelB-03 | 10000002 | |
| PanelA-04 | 10000007 | 10000010 | PanelB-06 | 10000007 | |
| PanelA-05 | 10000005 | | PanelB-07 | 10000005 | |
| PanelA-06 | 10000003 | | PanelB-02 | 10000003 | |
| PanelA-07 | 10000010 | 10000007 | PanelB-01 | 10000010 | |
| PanelB-01 | 10000007 | | PanelA-07 | 10000007 | |
| PanelB-02 | 10000003 | | PanelA-06 | 10000003 | |
| PanelB-03 | 10000002 | | PanelA-03 | 10000002 | |
| PanelB-04 | 10000004 | | PanelA-02 | 10000004 | |
| PanelB-05 | 10000062 | | PanelA-01 | 10000062 | |
| PanelB-06 | 10000010 | | PanelA-04 | 10000010 | |
| PanelB-07 | 10000005 | | PanelA-05 | 10000005 | |

FIG. 13

CABLE MANAGEMENT SYSTEM AND METHOD

CROSS-REFERENCE TO RELATED APPLICATION(S)

This application is a continuation of U.S. Non-Provisional patent application Ser. No. 17/730,753, filed on Apr. 27, 2022, which is a continuation of U.S. Non-Provisional patent application Ser. No. 17/191,984, filed on Mar. 4, 2021 (now U.S. Pat. No. 11,347,955 granted on May 31, 2022), which claims benefit to U.S. Provisional Patent Application No. 62/986,890, filed Mar. 9, 2020, and which also claims benefit to U.S. Provisional Patent Application No. 63/056,092, filed Jul. 24, 2020, the entirety of all of which are incorporated by reference herein.

TECHNICAL FIELD

The following relates to a device, system, method, and non-transitory computer readable medium for managing cables in a telecommunications or data center.

BACKGROUND

Datacenters and telecommunications moms utilize cabling to communicate large amounts of data. Some data centers can have several hundred thousand cables. It follows that cable management is time consuming, labor intensive work. Today there are two known approaches in widespread use.

A first known approach is manually tracing each cable and documenting the physical location of each cable end (i.e., cable end #1 is located on port 3 of patch panel "A" and cable end #2 is located on port 5 of patch panel "B"). This approach takes time and relies on static documentation which can grow stale quickly without constant updating and attention. If data center infrastructure management (DCiM) or some other cable management software is used, the cable location information must be entered manually.

A second known approach is to use no documentation. That is, cable infrastructure is not documented and instead cables are traced on an "as needed" basis. Too often this tracing is done after an outage occurs which can extend downtime and revenue loss.

Neither of these approaches are optimal as the first takes time and the second can prolong time to recovery during a failure. In that regard, data center outages can cause an enterprise to lose valuable resources as well as result in high costs to remediate, A solution that reduces the time spent tracing cables can save money and resources during installation and maintenance, as well as reduce the Mean Time To Recovery (MTTR) during system outages. Anything that can help reduce downtime during an outage can result in significant savings.

A need therefore exists for a cable management device, system, method, and application program designed to trace cables more efficiently as well as quickly audit existing installations and dynamically upload data to cable management systems.

SUMMARY

According to one non-limiting exemplary embodiment described herein, a cable management system is provided. The system comprises a plurality of cables, wherein each of the plurality of cables has a unique identifier associated therewith, and wherein each of the plurality of cables comprises a first barcode and a second barcode, the first barcode including the unique identifier and located proximate a first end of the cable, the second barcode including the unique identifier and located proximate a second end of the cable. The system further comprises a barcode scanner configured to scan barcodes of the plurality of cables, wherein the barcode scanner comprises a clip configured to receive one of the plurality of cables. The system further comprises a mobile computing device comprising a processor, a data storage medium, a communication unit, and a user interface including a display, wherein the mobile computing device is configured to receive via the user interface first end location information for a first one of the plurality of cables, receive from the barcode scanner the first barcode of the first one of the plurality of cables, and save and display the first end location information in association with the unique identifier of the first one of the plurality of cables included in the first barcode.

According to another non-limiting exemplary embodiment described herein, a method for managing a plurality of cables is provided, wherein each of the plurality of cables has a unique identifier associated therewith, and wherein each of the plurality of cables comprises a first barcode and a second barcode, the first barcode including the unique identifier and located proximate a first end of the cable, the second barcode including the unique identifier and located proximate a second end of the cable. The method comprises identifying first end location information for a first one of the plurality of cables, scanning the first barcode of the first one of the plurality of cables with a barcode scanner comprising a clip configured to receive the first one of the plurality of cables, and storing in a data storage medium the first end location information in association with the unique identifier of the first one of the plurality of cables included in the first barcode.

According to yet another non-limiting exemplary embodiment described herein, a non-transitory computer readable storage medium having stored computer executable instructions for managing a plurality of cables is provided, wherein each of the plurality of cables has a unique identifier associated therewith, and wherein each of the plurality of cables comprises a first barcode and a second barcode, the first barcode including the unique identifier and located proximate a first end of the cable, the second barcode including the unique identifier and located proximate a second end of the cable. Execution of the instructions causes a processor to receive first end location information for a first one of the plurality of cables, receive from a barcode scanner the first barcode of the first one of the plurality of cables, and store in a data storage medium the first end location information in association with the unique identifier of the first one of the plurality of cables included in the first barcode.

A detailed description of these and other non-limiting exemplary embodiments of a cable management system, method, and non-transitory computer readable storage medium is set forth below together with the accompanying drawings.

BRIEF DESCRIPTION OF THE DRAWINGS

FIG. 13 shows a mobile computing device, which may comprise a display, data storage medium, and processor configured to execute computer readable instructions for generating and displaying output results of "pass" and "fail" statuses for cables in the "scan and verify" mode, according to a non-limiting exemplary embodiment of the present disclosure.

DETAILED DESCRIPTION

Figure 1:
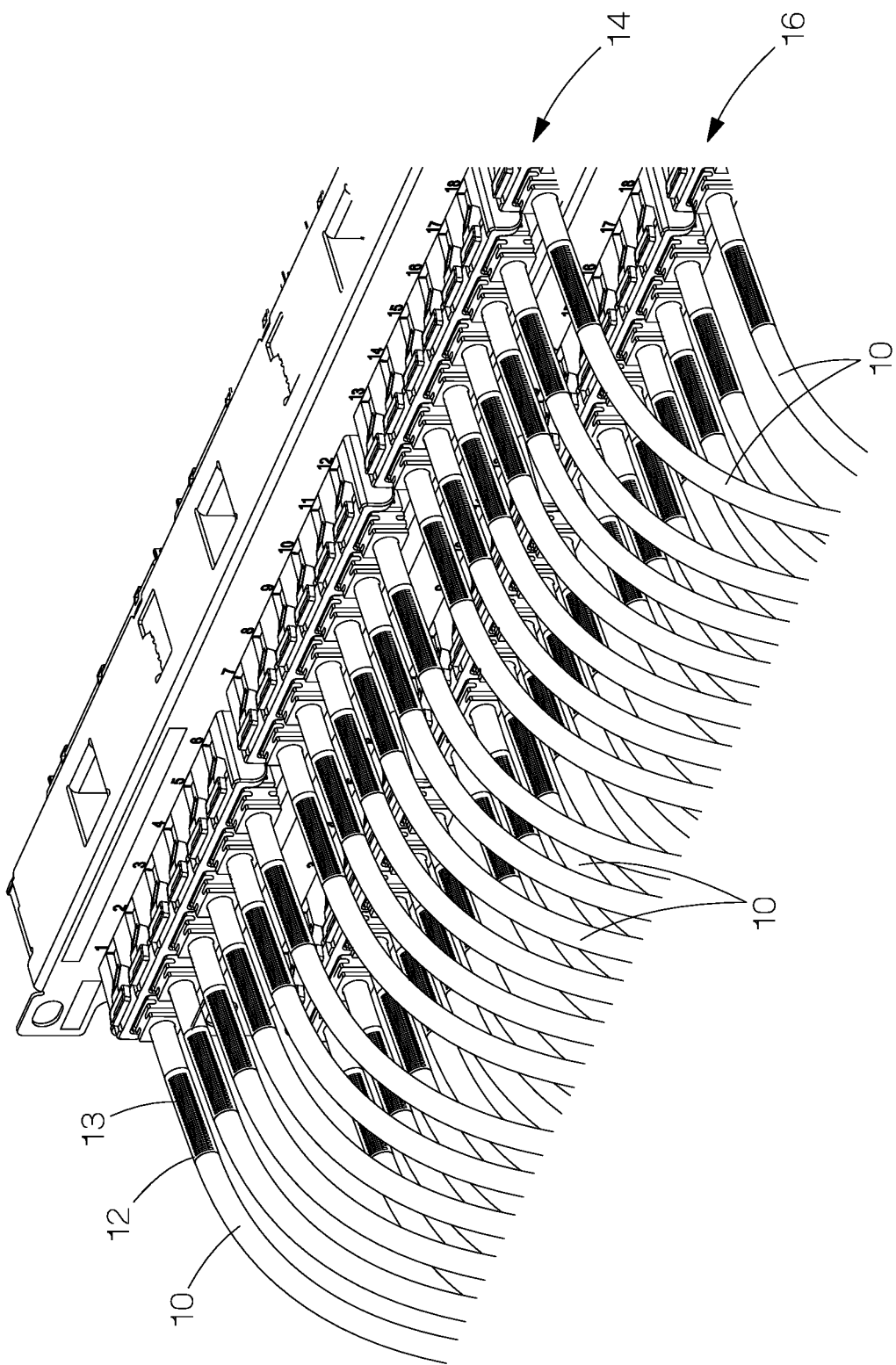
FIG. 1 shows a plurality of network cables connected between two patch panels, according to a non-limiting exemplary embodiment of the present disclosure.

In this disclosure, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to the figures, a more detailed description of non-limiting exemplary embodiments of a cable management device, system, method, and non-transitory computer readable medium will be provided. For ease of illustration and to facilitate understanding, like reference numerals have been used herein for like components and features throughout the drawings.

As previously described, a need exists for a cable management device, system, method, and application program designed to save time from tracing cables as well as create a way to quickly audit existing installations and dynamically upload data to cable management systems.

The present disclosure provides a cable management device, system, method, and non-transitory computer readable storage medium that addresses and/or meets such a need and solves the problems associated with the known cable management approaches described previously. The cable management device, system, method, and non-transitory computer readable storage medium of the present disclosure provide and/or utilize unique cable identifiers in conjunction with intelligence that can provide patch field cable documentation without the hassle of manually tracing cables and documenting their location. Once a patch field has been scanned, the cable management device, system, method, and non-transitory computer readable storage medium of the present disclosure can then use saved information to verify or find existing connections.

The cable management device, system, method, and non-transitory computer readable medium of the present disclosure for identifying and documenting connections between patch panel ports may comprise, provide, and/or utilize one or more patch panels or pieces of equipment with multiple network ports for connecting cables. The cable management device, system, method, and non-transitory computer readable medium of the present disclosure may further comprise, provide, and/or utilize various features as described herein.

The cable management device, system, method, and medium may comprise one or more cables 10 connected between patch panels 14, 16 as seen in FIG. 1. Although this disclosure describes the cables 10 being connected between patch panels 14, 16 according to exemplary embodiments, the cable management solution described herein may be implemented such that the cables 10 are connected between other networking devices such as servers, switches, routers, or other networking devices where cables are installed.

FIG. 1 shows a plurality of network cables 10 connected between a first patch panel A 14 and a second patch panel B 16 according to a non-limiting exemplary embodiment of the present disclosure. One or more of the cables 10 have a label 12 attached, where the label 12 includes a unique identifier 13 (i.e., collectively may be referred to as a "unique ID cable"). A unique ID cable may comprise a network patch cable 10 including a unique identifier 13 that has been attached, affixed, or placed at or proximate each end of the cable 10. According to some embodiments, the unique identifier 13 is placed a predetermined distance from the ends of the cable 10 such as within 3 inches of one, or both, ends of the cable 10, or within a range of 0.25 to 6 inches from one, or both, ends of the cable 10, According to some embodiments, the unique identifier 13, is placed to provide a predetermined distance 2 inches with a 0.5 inch tolerance) between the end of the cable plug boot to the edge of the label 12. According to some embodiments, the unique identifier 13 is placed at a predetermined location (e.g., distance from the ends of the cable 10 such as between 0.25 to 6 inches from one, or both, ends of the cable 10) based on the type of cable 10 being used (e.g., CAT6, shielded, breakout, fiber, etc.).

Figure 2:
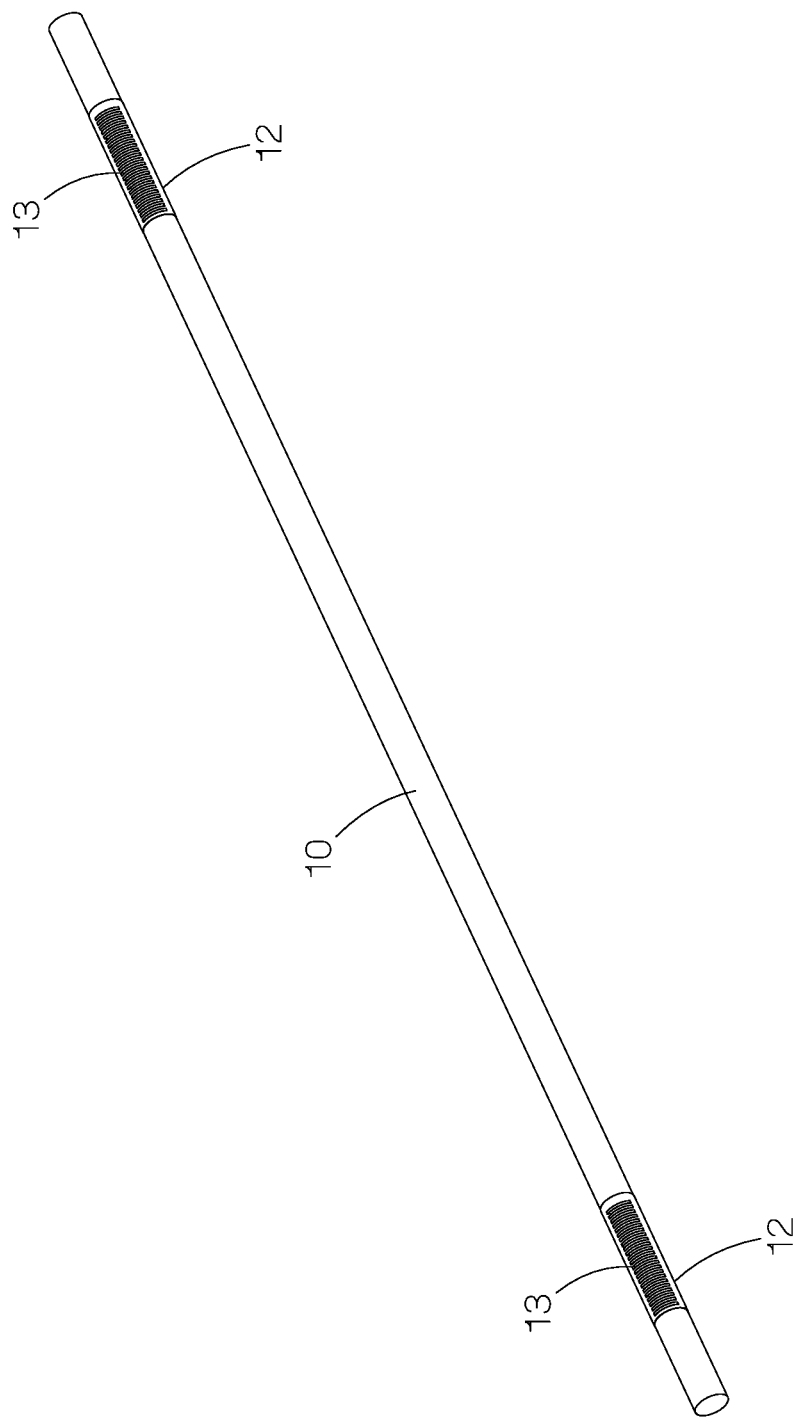
FIG. 2 shows a cable with unique identifiers on each end thereof, according to a non-limiting exemplary embodiment of the present disclosure.
Figure 3:
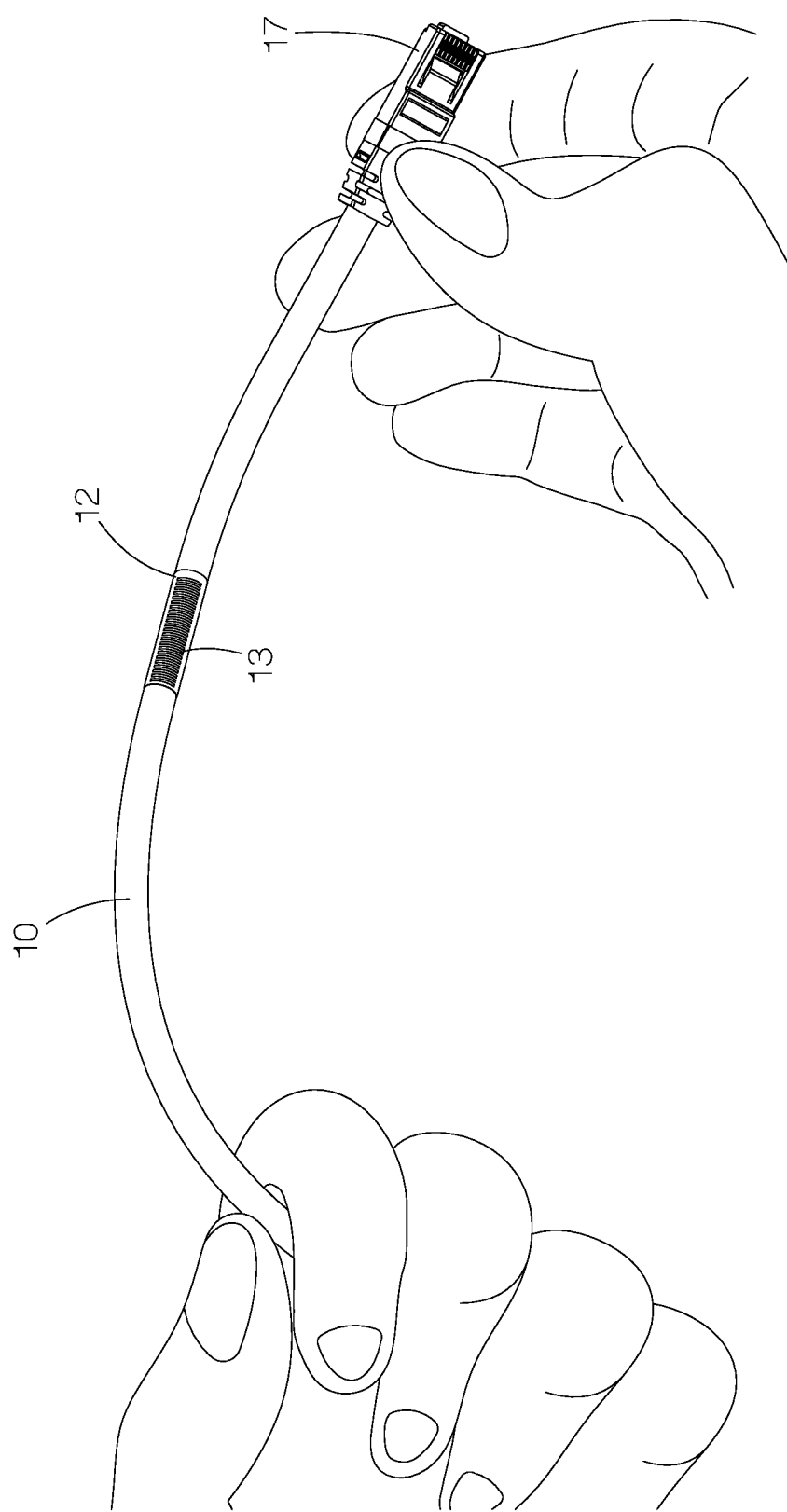
FIG. 3 shows a patch cable with a machine-readable unique identifier proximate an end of the cable, according to a non-limiting exemplary embodiment of the present disclosure.

According to the illustrated embodiments in FIG. 2, the unique identifier 13 is printed onto a label 12 and affixed onto the cable 10, where the unique identifier 13 is printed the form of barcodes. However, according to other embodiments the unique identifier 13 may be printed or etched directly onto the cable 10. Further, the unique identifier 13 may take on other forms of machine-readable codes such as a QR code, alphanumeric passcodes, or other passively detectable forms. The unique identifier 13 is representative of an identification code associated to the cable 10, and for corresponding the cable 10 with additional information such as installation location, production data, and/or cable attribute data, FIG. 2 depicts a cable 10 with a label 12 having a unique identifier 13 on each end thereof according to a non-limiting exemplary embodiment of the present disclosure. In a system of multiple cables 10, each unique identifier 13 is produced to identify a respective unique cable 10 and/or the location where each end of the cable 10 is installed. So according to some embodiments, the unique identifier 13 placed on each respective ends of a unique cable 10 will be slightly different to identify which end of the cable 10 the unique identifier 13 has been placed on. For example, the barcode placed at a first end A may correspond to a first identification code, and the barcode placed at a second end B may correspond to a second identification code, where the first and second identification code are mostly comprised of the same identification code other than a slight difference to identify their respective placement at the first end A or the second end B (e.g., 10000090A and 10000090B). FIG. 3 depicts a patch cable 10 with the machine-readable unique identifier 13 proximity to an end of the cable 10 according to a non-limiting exemplary embodiment of the present disclosure. Specifically, the unique identifier 13 is placed at a predetermined location on the cable 10 (e.g., predetermined distance from a plug 17 that terminates an end of the cable 10 shown in FIG. 3).

Figure 4:
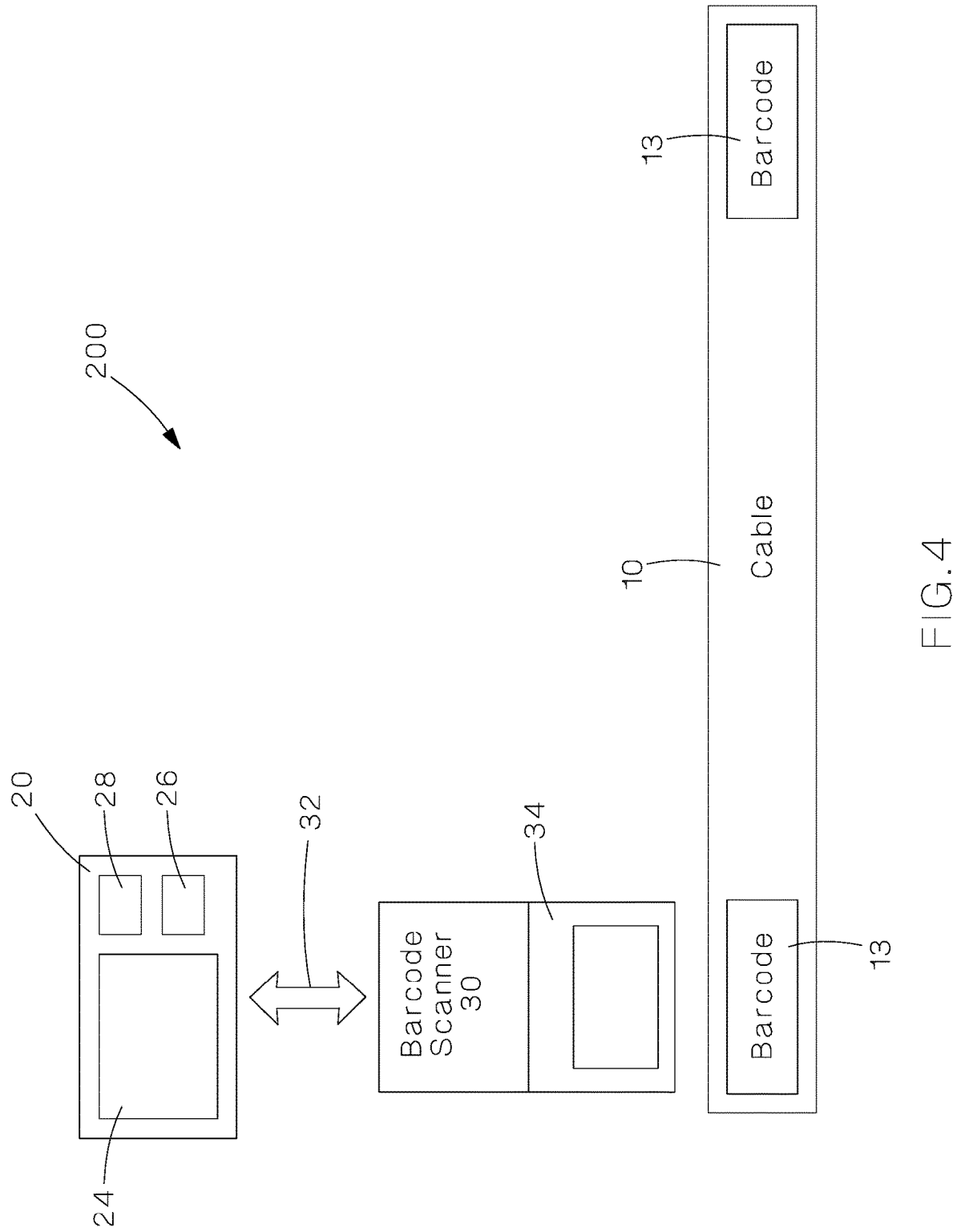
FIG. 4 shows a simplified block diagram of a cable management system, according to a non-limiting exemplary embodiment of the present disclosure.

FIG. 4 is a simplified block diagram of a cable management system 200 according to a non-limiting exemplary embodiment of the present disclosure. As seen therein, the system 200 comprises a mobile computing device 20, such as a tablet, smartphone, laptop, or other mobile computing device. The mobile computing device 20 may comprise a display 24, a data storage medium or memory 26, and a processor 28 configured to execute a cable management program or software according to the present disclosure (which application program may be referred to as the "cable management tool").

The system 200 may further comprise a barcode scanner 30, such as a general-purpose scanning device which may be used to scan the unique identifier 13 (e.g., barcode identifier) attached to the cable 10, and to communicate barcode information to the mobile computing device 20. Such communication may be accomplished via wired or wireless connection 32 between the barcode scanner 30 and the mobile computing device 20. According to other embodiments, the barcode scanner 30 may be replaced with a different detection device that is either a stand-alone device or integrated into the mobile computing device 20 capable of reading the unique identifier 13 (e.g., digital video camera, digital image camera, RFID reader, or the like).

The system 200 may still further comprise a scanner clip 34 that is attached, affixed, or otherwise mounted to the barcode scanner 30. Alternatively, the scanner clip 34 may be an integral part of or integrated with the barcode scanner 30. The scanner clip 34 includes a viewing window 36 formed therein for allowing a user operating the barcode scanner 30 to view the unique identifier 13 of the cable 10 that is being held by the scanner clip 34. The viewing window 36 may be a cut-out portion or made from a sheet of non-opaque material. According to some embodiments, the viewing window 36 may not be included. The scanner clip 34 includes a hook portion 38 configured to receive/grab and isolate the individual cable 10 having the identifier 13 to be scanned, as will be described in more detail with reference to FIGS. 5A and 5B.

Figure 5A:
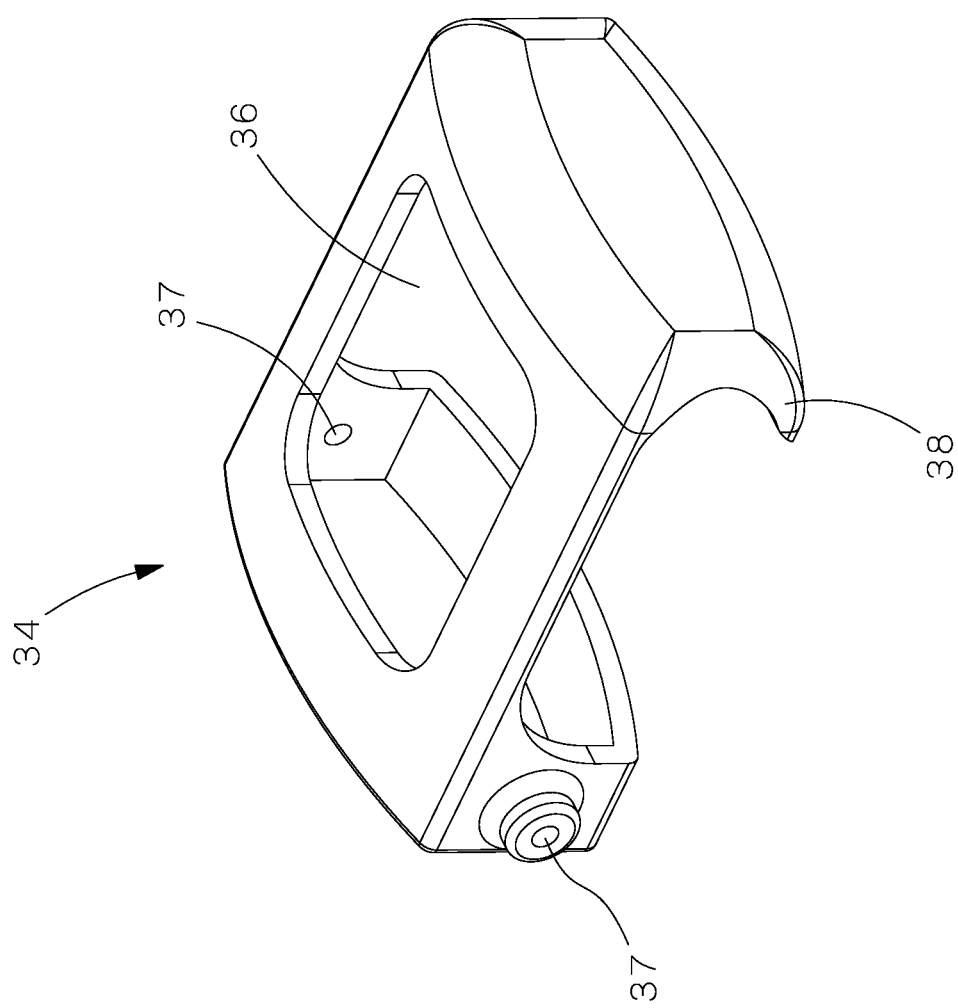
FIG. 5A shows a perspective view of a scanning clip for use with a barcode scanner to scan a unique identifier of a cable, according to a non-limiting exemplary embodiments of the present disclosure.
Figure 5B:
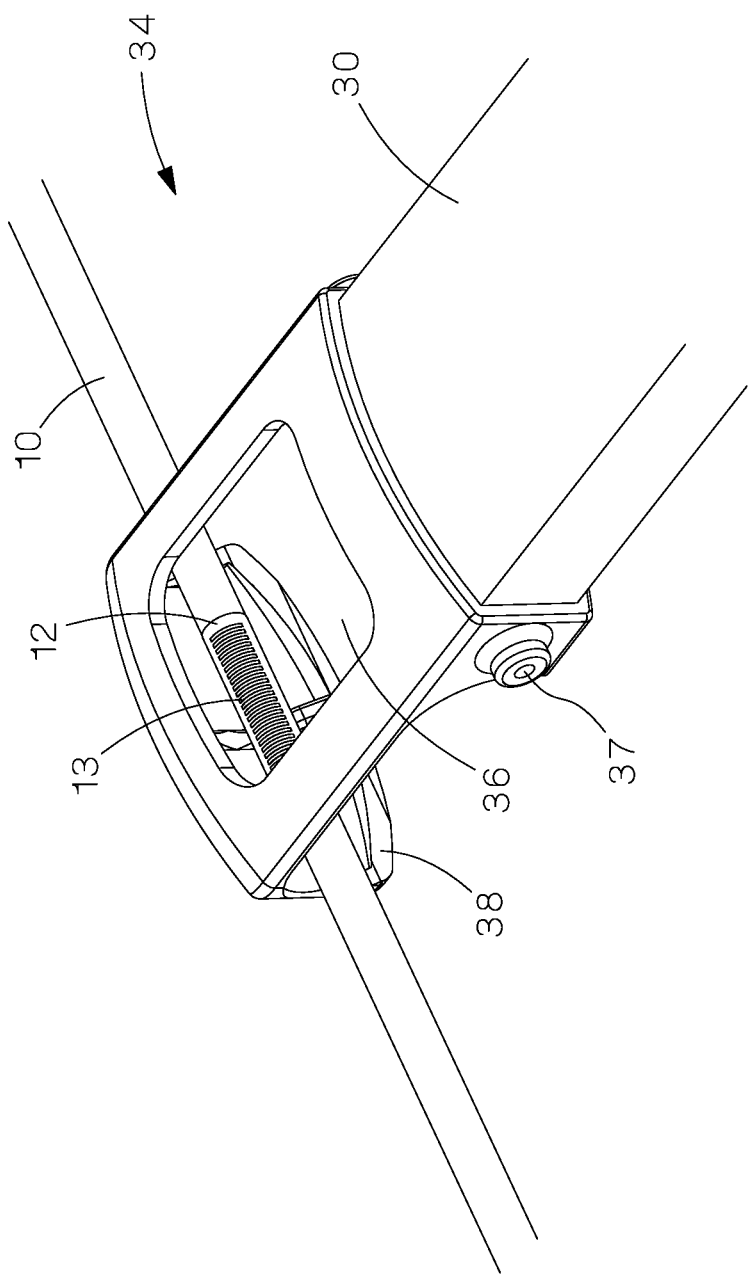
FIG. 5B shows a perspective view of the scanning clip shown in FIG. 5A, where the scanning clip is attached to a barcode scanner for scanning a unique identifier of a cable, according to a non-limiting exemplary embodiments of the present disclosure.

In that regard, FIGS. 5A and 5B are perspective views of the scanner clip 34 for use with the barcode scanner 30, where the scanner clip 34 is configured to hold the cable 10 while the barcode scanner 30 scans the unique identifier 13 according to non-limiting exemplary embodiments of the present disclosure. As illustrated in FIG. 5A, the scanner clip 34 includes mounting features 37 configured to attach, affix, or mount the scanner clip 34 to the barcode scanner 30.

FIG. 5B depicts the scanner clip 34 attached, affixed, or mounted to a scanning end of the barcode scanner 30. As seen therein, the hook portion 38 of the scanner clip 34 is configured to receive/grab and isolate the individual cable 10 to bring the unique identifier 13 into view of a scanning input window at the scanning end of the barcode scanner 30. The viewing window 36 in the scanner clip 34 enables a user holding the barcode scanner 30 to view the unique identifier 13 through the viewing window 36 as the cable 10 is being held by the hook portion 38. The scanner clip 34, therefore, enables the individual cable 10 to be quickly and easily isolated from other neighboring cables so that its unique identifier 13 can be successfully and accurately scanned for input into the cable management tool. This way, the scanner clip 34 helps increase the efficiency of the scanning processing for identifying and associating a large number of cables installed into panels 14, 16 and port numbers by reducing the time needed to do so in a system of patch panels as shown in FIG. 1.

Referring again to FIG. 4, the cable 10 may be any type including, but not limited to, copper wire ethernet cable, fiber optic cable, hi-density fiber cable, or breakout cable. The cable 10 may comprise the label 12 including the unique identifier 13 near each end thereof, where the label 12 may take the form of a printed label attached or affixed to the cable 10 proximate each end thereof. The unique identifier 13 according to the described embodiments are barcodes, where the barcodes are used to obtain an identification code that is used to look-up the respective cable 10, the cable's 10 to/from installation location, and/or cable production data such as, but not limited to, cable manufacturing information (e.g., cable length, part number, cable type), quality control data, country of origin, production date, material lot number, category of cable, plenum or LSZH material confirmation, test result data such as insertion loss, crosstalk, DC resistance, or other information known about the cable (hereinafter collectively referred to as the cable information). The unique identifier 13 is created to uniquely correspond to each associated cable 10 included in the system. To enable the look-up function, the identification code obtained from scanning the unique identifier 13 and the corresponding cable information may be stored as part of a lookup table or database that is part of the cable management tool described herein. In the case of a breakout cable, the cable ID may include a decimal format (e.g., 1.1, 1.2, 1.3, etc.) to account for the single breakout cable including a plurality of individual cables that fan out from the main breakout cable formation.

It should be noted that the mobile computing device 20, the barcode scanner 30, and/or any other computing unit, module, controller, system, subsystem, mechanism, device, component or the like described herein may comprise appropriate circuitry, such as one or more appropriately programmed processors (e.g., one or more microprocessors including central processing units (CPU)) and associated memory or data storage medium, which may include stored operating system software and/or application software executable by the processor(s) for controlling operation thereof and for performing the particular algorithms represented by the various functions and/or operations described herein, including interaction and/or communication between and/or cooperation with each other. One or more of such processors or several such processors and/or circuitry and/or hardware may be distributed among several separate units, modules, controllers, systems, subsystems, mechanisms, devices, components, or the like.

The cable management tool may be an app installed onto the mobile computing device 20 for use in performing the cable management method of the present disclosure, and which may be implemented at least in part as machine (e.g., computer) executable instructions stored on or in a non-transitory computer readable storage medium. The cable management tool may further include software, hardware, middleware, application programming interface, circuitry, and/or other components for implementing the features described herein that relate to the cable management tool.

The cable management tool may be configured to run or be executed by the processor 28 of the mobile computing device 20 to manage and locate the large number of cables 10 that are found attached to patch panels 14, 16 installed on a network rack (see e.g., FIG. 1). The cable management tool is configured to receive the unique identifier 13 information from the barcode scanner 30 and identify the identification code represented by the barcode. Then, the cable management tool is configured to search or lookup, in a database or table, the cable information associated to the identification code. For example, the cable management tool may communicate, via an application programming interface (API), with an offsite server to access the database or table stored on the server. The cable information stored within the database or table may be downloaded onto the mobile computing device 20 using the cable management tool, and further be printed onto labels. Communication with the server may be implemented via either the wired or wireless connection 32 provided by the mobile computing device 20.

The cable management tool may operate within the cable management system 200 in any of three modes: 1) Scan Mode; 2) Scan and Verify Mode; or 3) Find Mode. The cable management tool may also be configured to generate reports detailing the cable locations. Such reports can be exported or uploaded to a data storage medium, such as cloud storage, which may comprise a database, transmitted to another user at a remote location, and/or stored on memory storage included in the mobile computing device 20. The report may be in a flat file format according to some embodiments.

Figure 6:
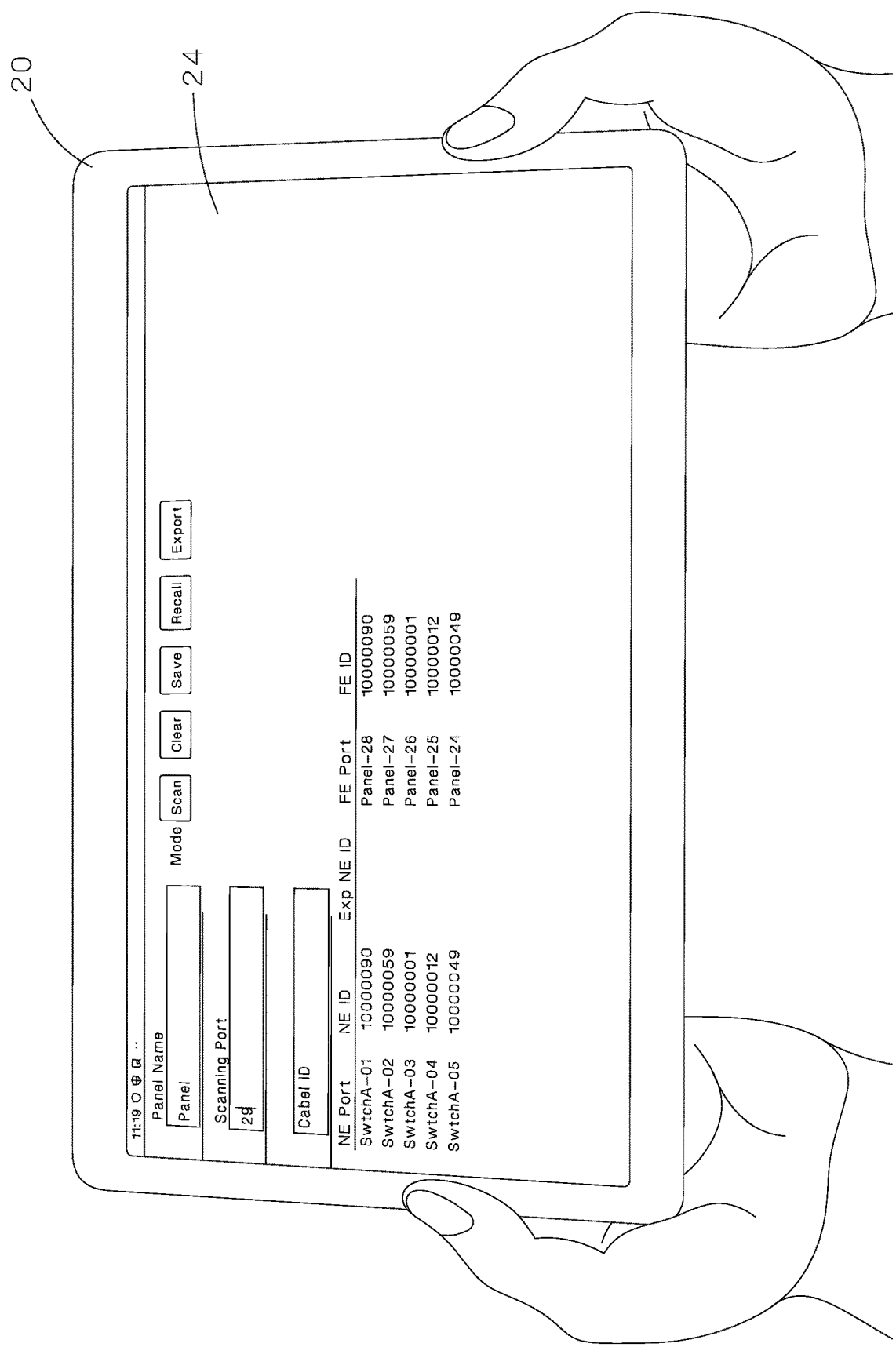
FIG. 6 shows a mobile computing device, which may comprise a display, data storage medium, and processor configured to execute computer readable instructions to implement a cable management tool, according to a non-limiting exemplary embodiment of the present disclosure.

FIG. 6 shows an exemplary view of the mobile computing device 20 executing the cable management tool and displaying a graphical user interface (GUI) of the cable management tool on the display 24. As described, the mobile computing device 20 includes the hardware, software, and/or circuitry for executing the cable management tool. In particular, the machine-readable instructions that comprise the cable management tool are stored in the memory 26, and the processor 28 reads these machine-readable instructions and executes them to run the cable management tool according to the present disclosure.

As previously described, the cable management system 200 includes the barcode scanner 30 which may be connected via Bluetooth, Universal Serial Bus (USB), or any other type of wired or wireless connection 32 to the mobile computing device 20 configured to run the cable management tool. Once again, the cable management system 200 further comprises the barcode scanner clip 34 used to isolate the individual cable 10 from a plurality of surrounding cables, scan the unique identifier 13 from the cable 10.

As previously noted, the cable management tool may operate in or according to various modes. Such modes may comprise a "scan" mode, a "scan and verify" mode, and a "find" mode for managing cables as a front of panel solution where cables are being installed between networking devices. Various non-limiting steps, functions, functionality, operations, features, and/or processes for such modes will now be described. In that regard, it should be noted that such steps, functions, functionality, operations, features, and/or processes may be performed at different times, in an order or orders other than those described, and/or that one or more may be omitted. The "scan" mode, the "scan and verify" mode, and the "find" mode, may each comprise one or more of the following steps 1-6:

Step 1: Start with an existing patch field that incorporates the unique ID cables described herein. The existing patch field may comprise one or more patch panels 14, 16 (see FIG. 1) containing multiple ports. The patch field utilizes unique ID patch cables 10 to make connections between two ports in the patch field.

Step 2: Run the cable management tool on the mobile computing device 20. Once again, FIG. 6 depicts the mobile computing device 20 displaying a GUI on the display 24 of the mobile computing device 20 based on an execution of machine-readable instructions of the cable management tool, according to a non-limiting exemplary embodiment of the present disclosure.

Figure 7:
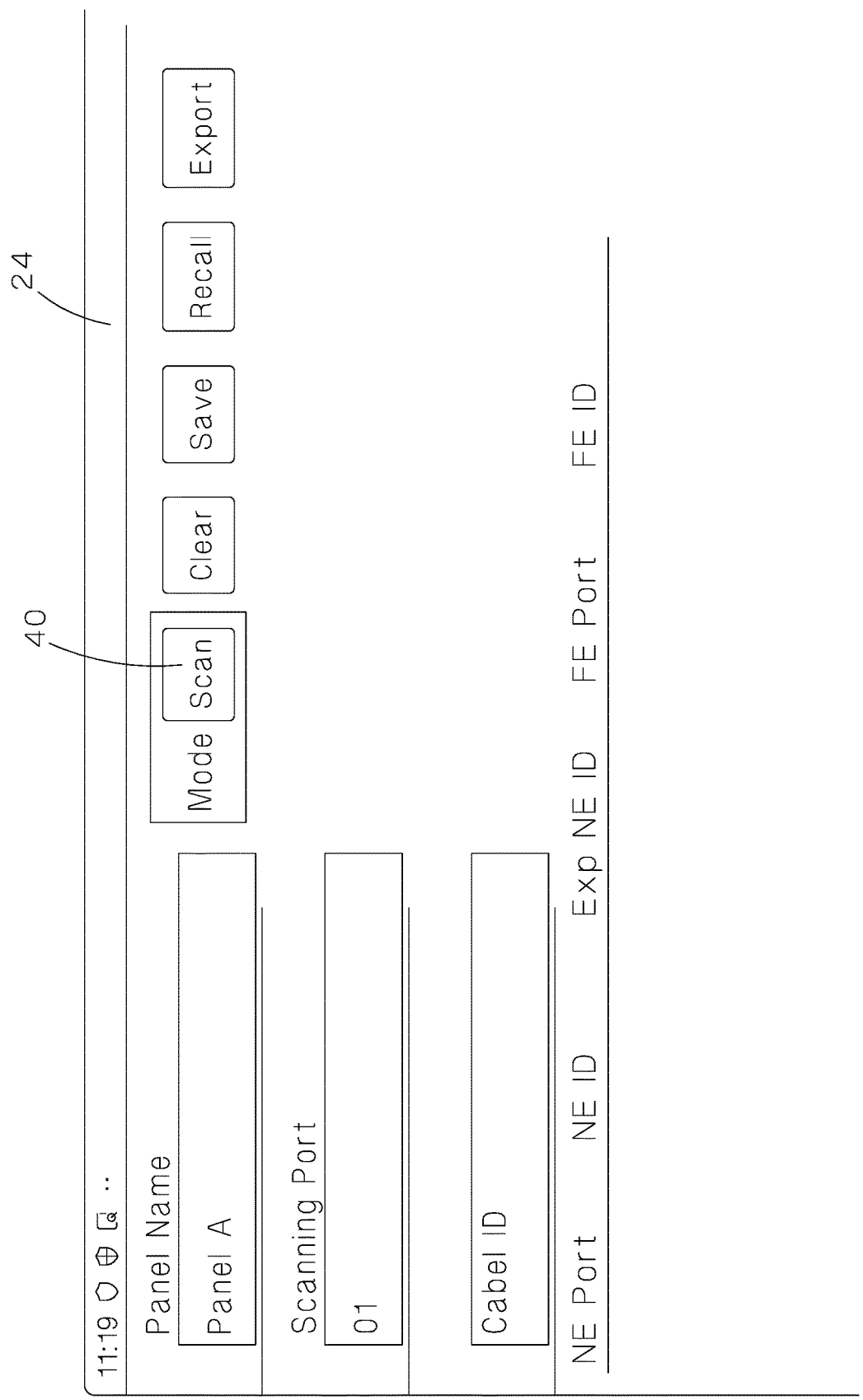
FIG. 7 shows a mobile computing device, which may comprise a display, data storage medium, and processor configured to execute computer readable instructions for entering a "scan" mode, according to a non-limiting exemplary embodiment of the present disclosure.

Step 3: Change, enter, and/or set the software mode to "scan" mode. In that regard, FIG. 7 depicts the mobile computing device 20 executing machine-readable instructions for running the "scan" mode 40 and displaying a GUI of the "scan" mode 40 on the display 24, according to a non-limiting exemplary embodiment of the present disclosure.

Figure 8:
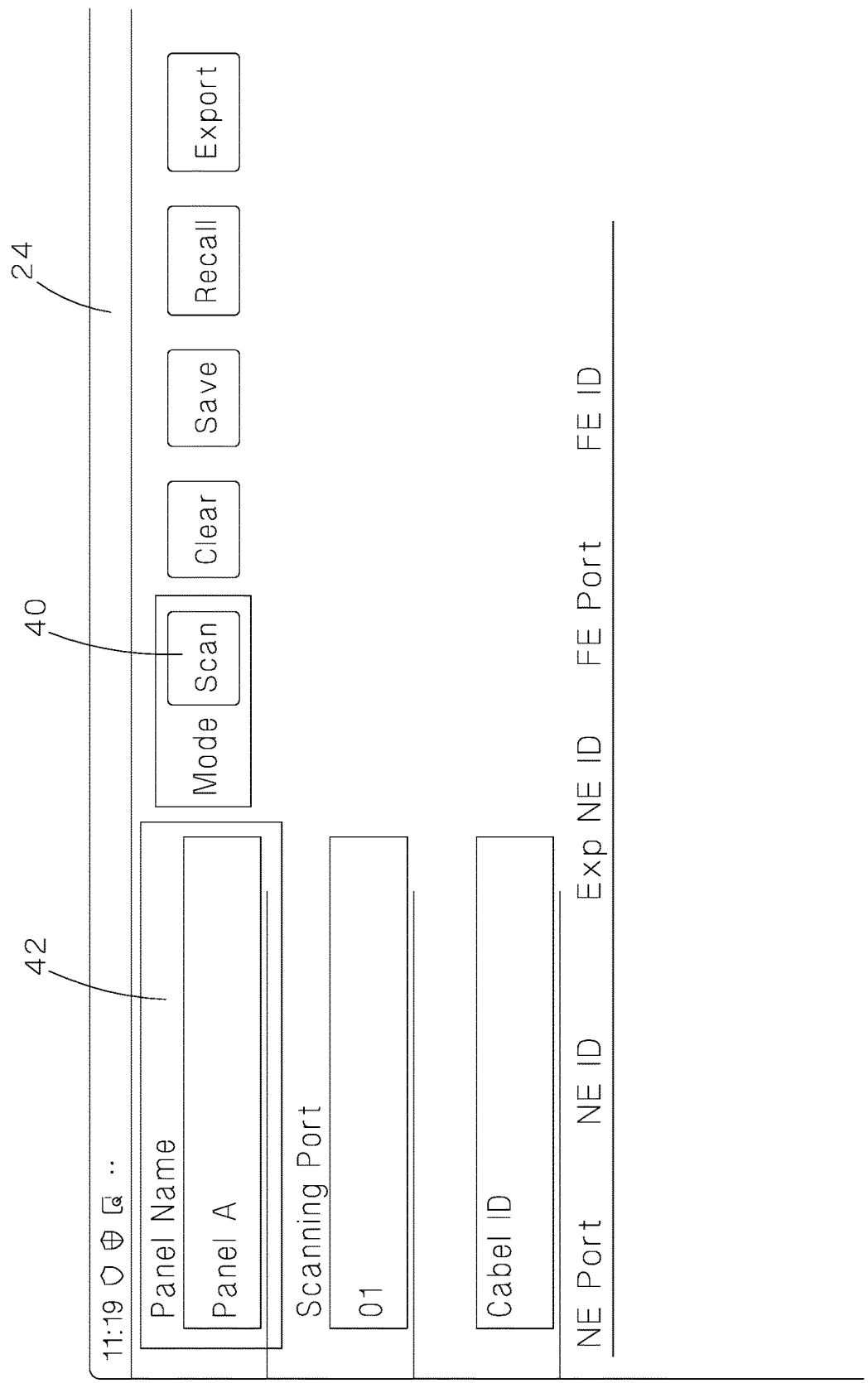
FIG. 8 shows a mobile computing device, which may comprise a display, data storage medium, and processor configured to execute computer readable instructions for receipt and/or entry of networking device information in the "scan" mode, according to a non-limiting exemplary embodiment of the present disclosure.

Step 4: Enter the name of the patch panel being scanned into the "Panel Name" field. FIG. 8 depicts the mobile computing device 20 executing machine-readable instructions for running the "scan" mode 40 to enable entry of patch panel name information into the "Panel Name" information entry field 42 included in the GUI of the "scan" mode 40 displayed on the display 24, according to a non-limiting exemplary embodiment of the present disclosure. A user may utilize an input device (e.g., touch screen keyboard, mechanical keyboard, speech input, or the like) to enter the patch panel name information into the "Panel Name" information entry field 42.

Figure 9:
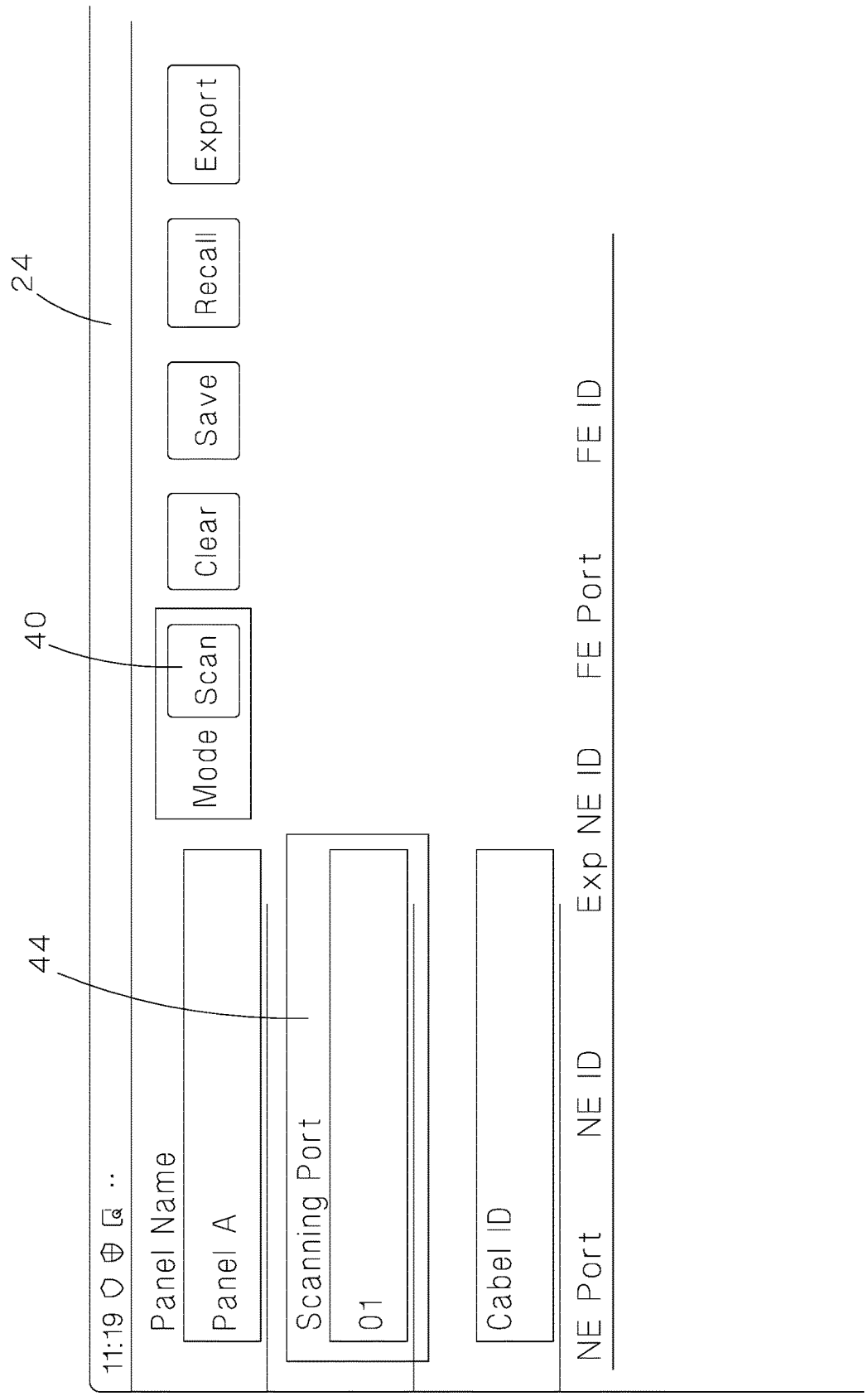
FIG. 9 shows a mobile computing device, which may comprise a display, data storage medium, and processor configured to execute computer readable instructions for receipt and/or entry of port information in the "scan" mode, according to a non-limiting exemplary embodiment of the present disclosure.

Step 5: Enter the port number into the "Scanning Port" field. In that regard, FIG. 9 depicts the mobile computing device executing machine-readable instructions for running the "scan" mode 40 to enable entry of port number information into the "Scanning Port" information entry field 44 included in the GUI of the "scan" mode 40 displayed on the display 24, according to one non-limiting exemplary embodiment of the present disclosure. A user may utilize an input device (e.g., touch screen keyboard, mechanical keyboard, speech input, or the like) to enter the port number information into the "Scanning Port" information entry field 44.

Step 6: Scan the unique identifier 13 of the cable 10 associated with the patch panel and port entered. After scanning the unique identifier 13 with the barcode scanner 30, the port number in the "Scanning Port" information entry field 44 (see e.g., FIG. 9) increments by one automatically to allow data entry at the next port. If the incremented port number displayed in the "Scanning Port" information entry field 44 is not correct, the user may manually enter the next patch panel name and/or correct next port number to scan in information. This process is continued until all cables 10 connected to ports have been scanned.

Step 7: While the user is scanning the unique identifier 13 of the cables 10, the cable management tool stores the information obtained from scanning the unique identifier 13 in a database along with the corresponding panel and port number (i.e., location information), The cable management tool is now able to accurately locate matching unique identifiers and correlate them to the associated cables and their physical patch panel and port locations. The cable management tool may also display these matches on the display 24 of the mobile computing device 20 as connections.

Figure 10:
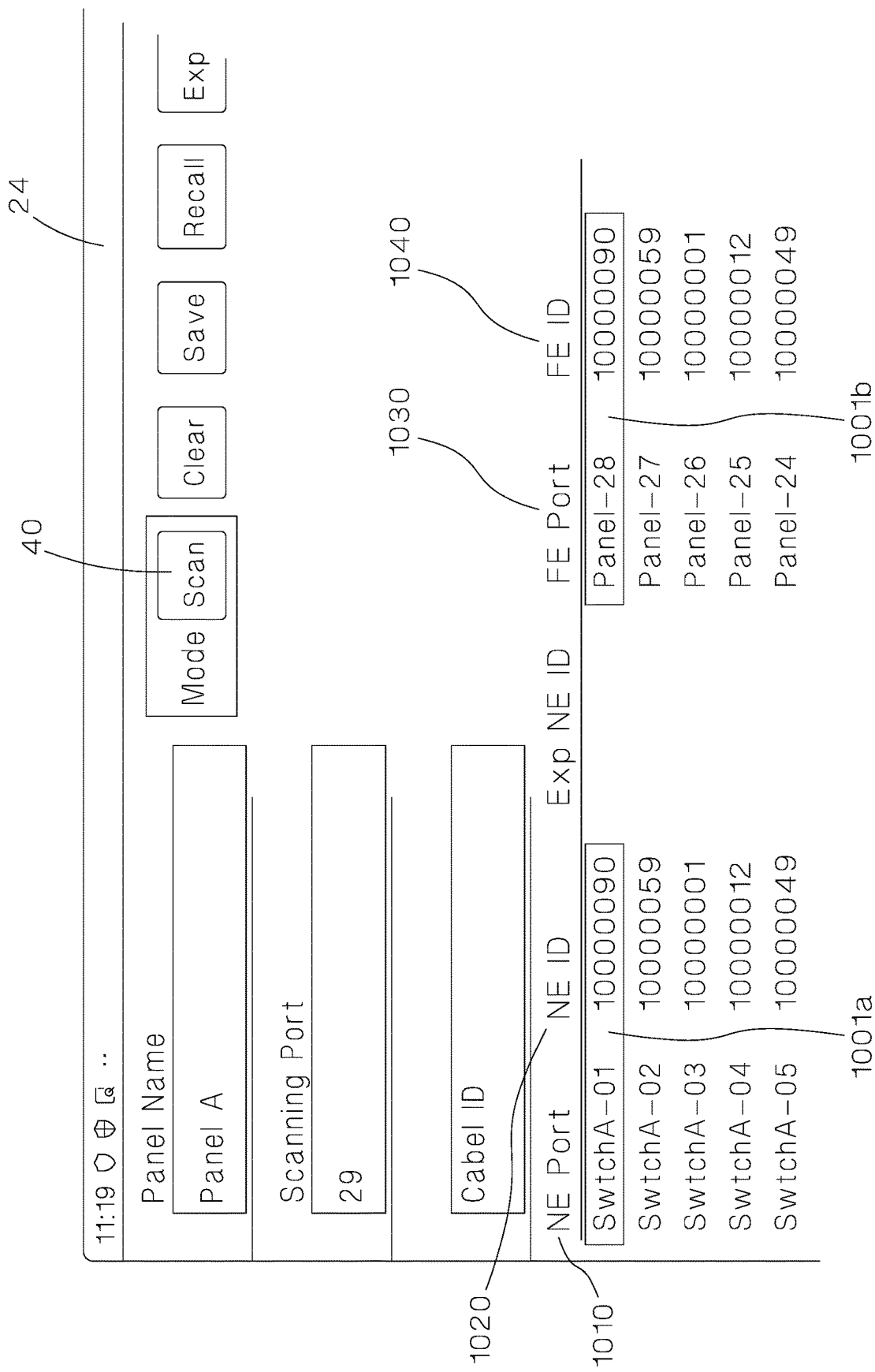
FIG. 10 shows a mobile computing device, which may comprise a display, data storage medium, and processor configured to execute computer readable instructions for generating and displaying output of matching unique identification tags and corresponding physical ports in the "scan" mode, according to a non-limiting exemplary embodiment of the present disclosure.

In that regard, FIG. 10 depicts the display 24 of the mobile computing device 20 displaying an output GUI that matches unique identifier tags with their corresponding physical port information 1001*a*, 1001*b* in the "scan" mode 40, according to a non-limiting exemplary embodiment of the present disclosure. These results can be exported 48 and/or transmitted as desired, such as to a remote user, a data storage medium such as cloud storage (which may comprise a database), an excel spreadsheet, or a comma separated values file for import into other management systems.

For example, data may be exported via a comma-separated text file (.csv file extension). Each file represents a telecom room or data center. The location fields may be manually entered in the cable management tool, where the ID fields are the value of the scanned unique identifier 13. As seen in FIG. 10, the output fields may be Near End port location (NE Port) 1010, Near End ID Number (NE ID) 1020, Far End port location (FE Port) 1030, Far End ID number (FE ID) 1040. Sample output for such fields in a comma separated .csv file format with the data shown in FIG. 10 may appear as follows:

SwtchA-01,10000090,Panel-28,10000090
SwtchA-02,10000059,Panel-27,10000059
SwtchA-03,10000001,Panel-26,10000001
SwtchA-04,10000012,Panel-25,10000012

Figure 11:
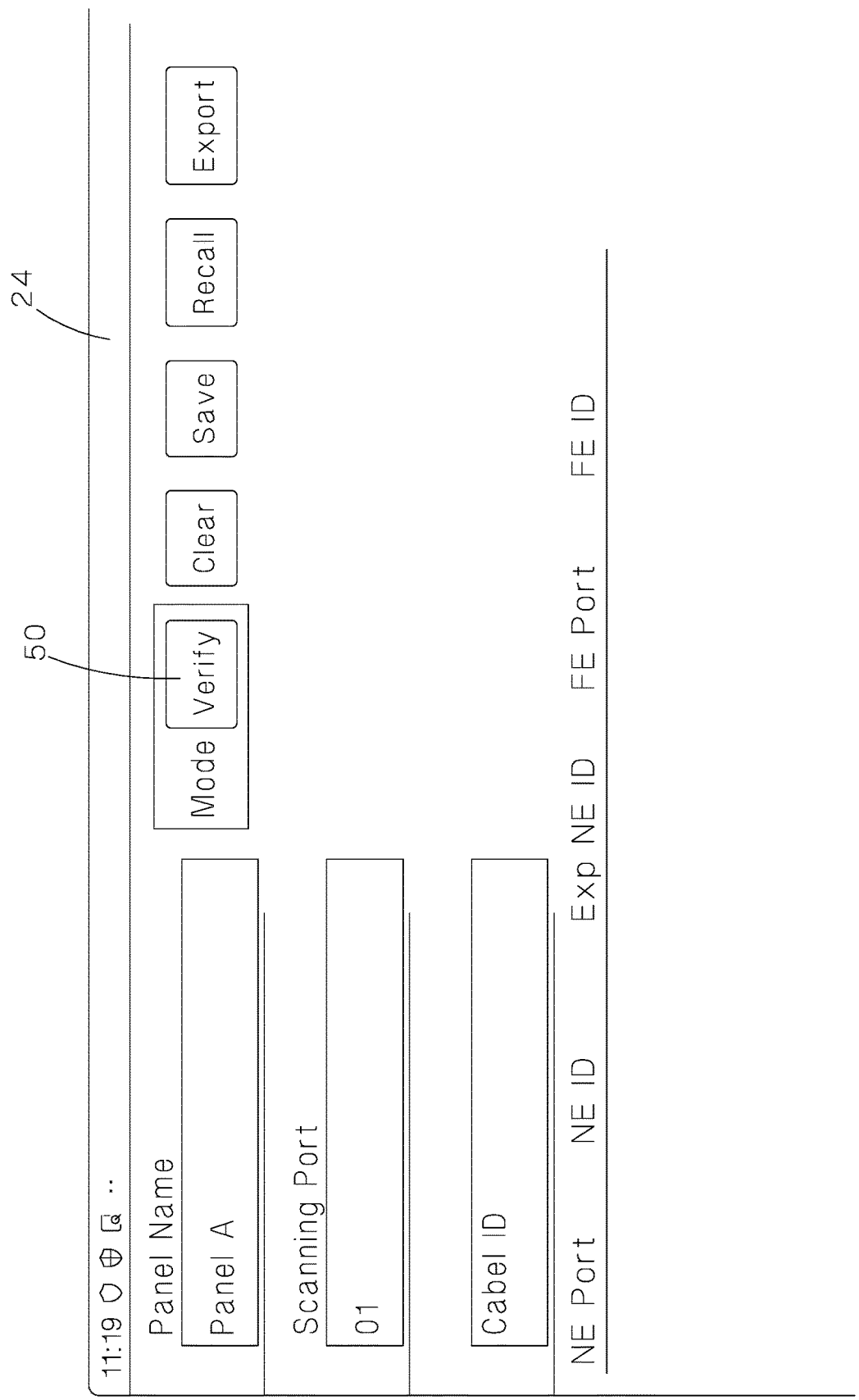
FIG. 11 shows a mobile computing device, which may comprise a display, data storage medium, and processor configured to execute computer readable instructions for entering a "scan and verify" mode, according to a non-limiting exemplary embodiment of the present disclosure.
Figure 12:
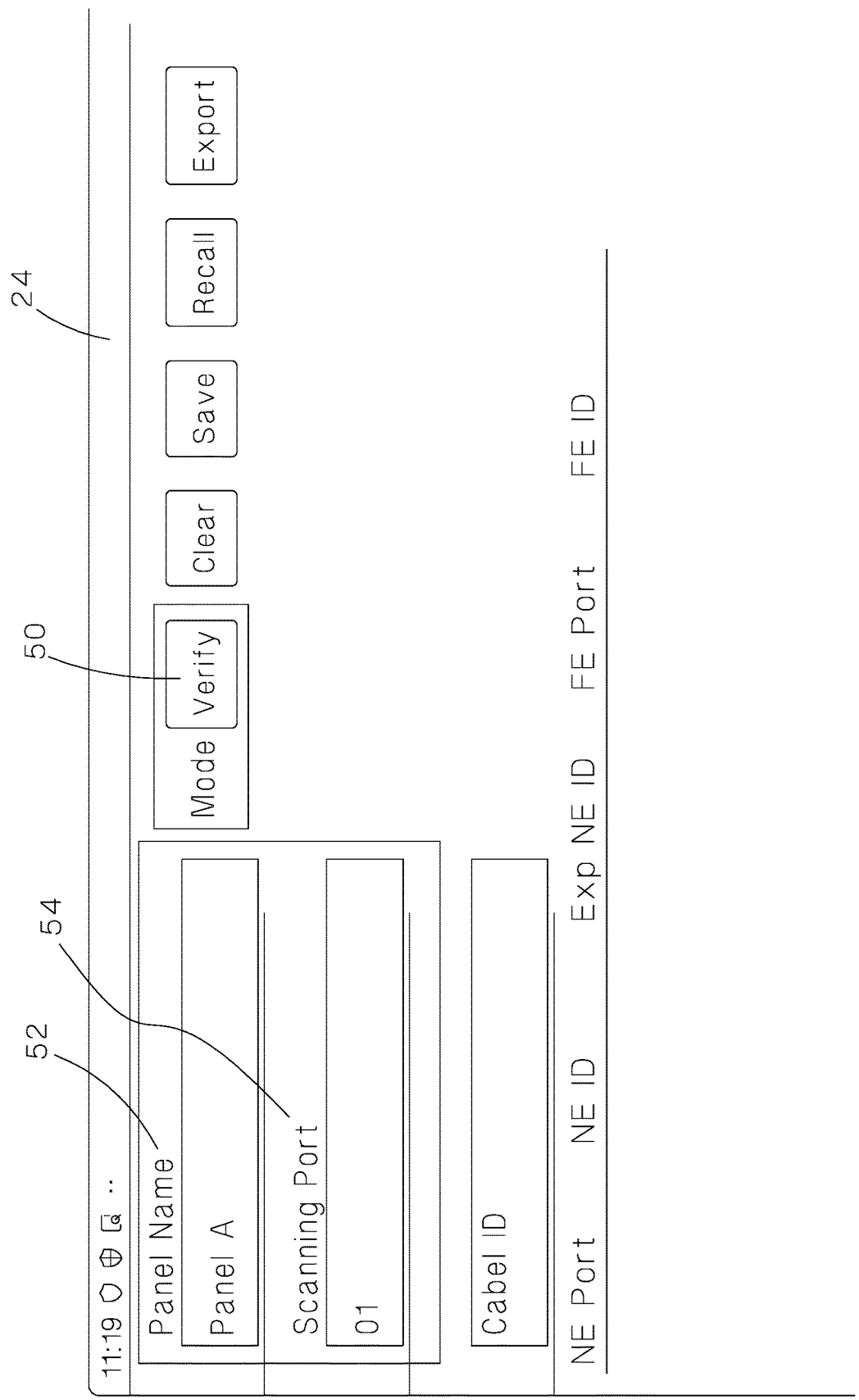
FIG. 12 shows a mobile computing device, which may comprise a display, data storage medium, and processor configured to execute computer readable instructions for receipt and/or entry of panel name and port number information of a next port to scan in the "scan and verify" mode, according to a non-limiting exemplary embodiment of the present disclosure.

The "scan and verify" mode 50 may further comprise one or more steps 8-10 as described—below with reference to FIGS. 11-13. Once again, it should be noted that such steps, functions, functionality, operations, features, and/or processes may be performed at different times, in an order or orders other than those described, and/or that one or more may be omitted.

Step 8: Select "scan and verify" mode 50. In that regard, FIG. 11 depicts the mobile computing device 20 executing machine-readable instructions for entering the "scan and verify" mode 50, according to a non-limiting exemplary embodiment of the present disclosure. In FIG. 11, a GUI corresponding to the "scan and verify" mode 50 is displayed on the display 24 of the mobile computing device 20. The "scan and verify" mode 50 uses previously saved results from the "scan" mode 40 (see e.g., FIGS. 7-10) operation to verify whether cables 10 have moved since the last scanning. If saved results do not exist, steps 1 through 6 described previously are performed. In addition, or alternatively, according to some embodiments the saved results used for verification may be downloaded as a set of predetermined installation location results so that the current scanning operation can be compared against.

Step 9: Enter panel name and port number of the current patch panel port location to be verified. FIG. 12 depicts the mobile computing device 20 executing machine-readable instructions for running the "scan and verify" mode 50 to enable entry of patch panel name information into the "Panel Name" information entry field 52 included in the GUI of the "scan and verify" mode 50 displayed on the display 24, according to a non-limiting exemplary embodiment of the present disclosure. FIG. 12 also depicts the mobile computing device 20 executing machine-readable instructions for running the "scan and verify" mode 50 to enable entry of scanning port name information into the "Scanning Port" information entry field 54 included in the GUI of the "scan and verify" mode 50 displayed on the display 24, according to a non-limiting exemplary embodiment of the present disclosure. A user may utilize an input device (e.g., touch screen keyboard, mechanical keyboard, speech input, or the like) to enter the patch panel name information into the "Panel Name" information entry field 52 as well as the scanning port name information into the "Scanning Port" information entry field 54.

Step 10: Scan unique identifier 13 of the cable 10 in a selected port. The cable management tool identifies the current cable 10 based the scanned unique identifier 13 and looks up its corresponding installation location information from the stored database that tracks its panel and/or port installation location information from the last time it has been scanned (or based on previously downloaded installation location data). The comparison is then given a PASS/FAIL grade based on whether the comparison of the inputted location from Step 9 matches the previously installed location information looked up in Step 10 (PASS) or does not match (FALL), and a corresponding notification may be output to the display 24. In that regard, FIG. 13 depicts the mobile computing device 20 displaying the results of the PASS/FAIL status information 55 (which may take the form of color-coded information, such as green for pass and red for fail, or other visual indicator such as a flag or other symbol to identify failing status or passing status) based on the comparison in the "scan and verify" mode 50, according to one non-limiting exemplary embodiment of the present disclosure. If the current location information that has been inputted matches the stored and expected location information for the cable that has been identified from the stored database based on the scanned unique identifier 13, a "pass" status is reported. If the current location does not match the stored database record for that cable's identification code obtained from the scanning of the unique identifier 13, a "fail" status is reported. The fail status also reports the last recorded cable identification code 56 (cable identification code 10000007 Expected Near End ID (Exp NE ID)) for that location as an expected identifier value.

Figure 14:
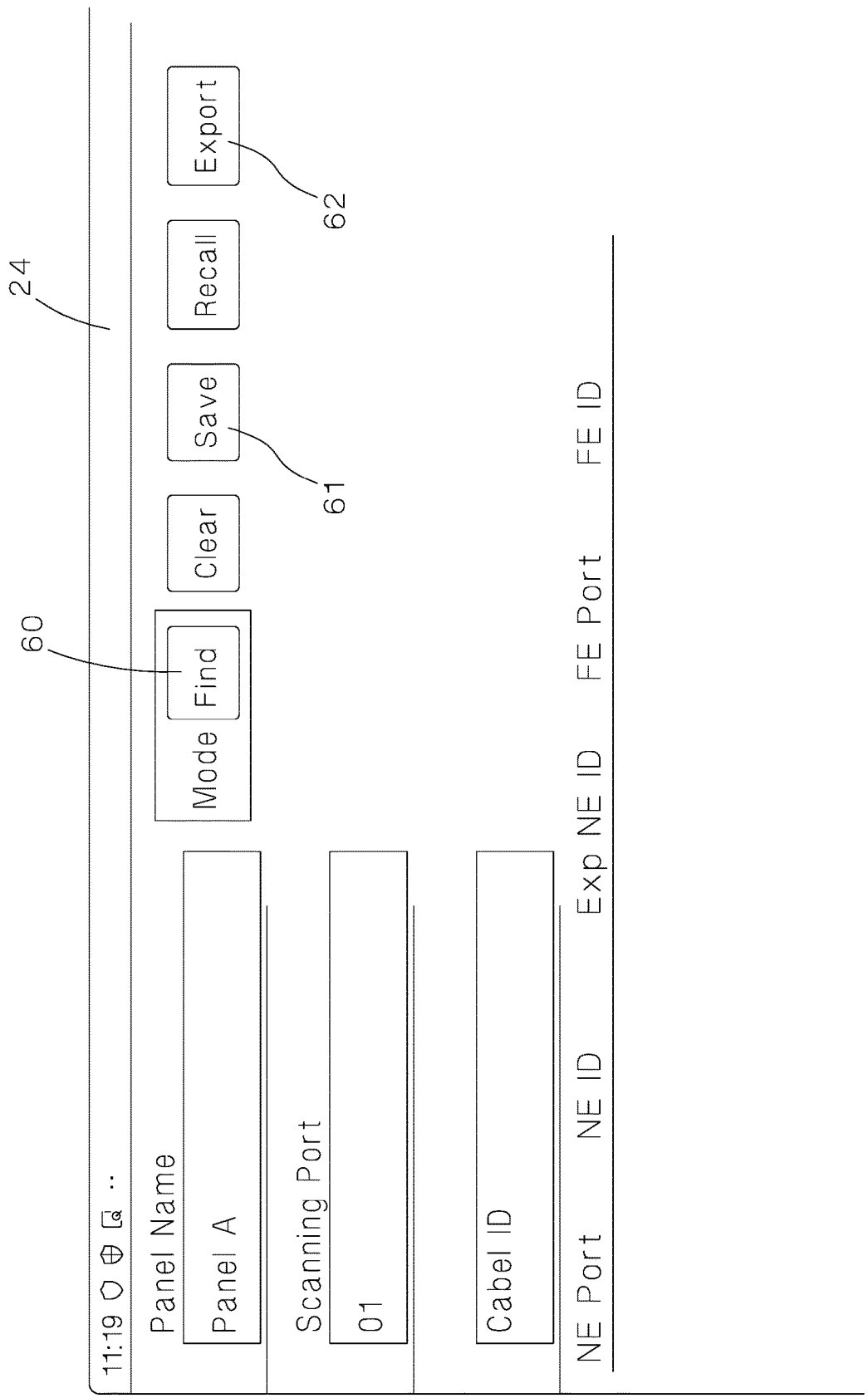
FIG. 14 shows a mobile computing device, which may comprise a display, data storage medium, and processor configured to execute computer readable instructions for entering a "find" mode, according to a non-limiting exemplary embodiment of the present disclosure.

The "find" mode 60 may further comprise steps 11-13 as described below with reference to FIG. 14. Once again, it should be noted that such steps, functions, functionality, operations, features, and/or processes may be performed at different times, in an order or orders other than those described, and/or that one or more may be omitted.

Step 11: Select the "find" mode 60. In that regard, FIG. 14 depicts the mobile computing device 20 executing machine-readable instructions for entering the "find" mode 60, according to one non-limiting exemplary embodiment of the present disclosure. FIG. 14 shows a GUI that is displayed on the display 24 of the mobile computing device 20 according to the "find" mode 60. The "find" mode 60 is useful when one end of the cable 10 has been located and it is desired to find the other end of that same cable 10. With the "find" mode 60, there is a first known cable 10 that a user is trying to match and there are target cables 10 that could potentially be the other end of the first known cable 10.

Step 12: Scan the unique identifier 13 on the first end of the cable 10 first location). Once the unique identifier 13 at the first end has been scanned, the cable identification code corresponding to this scanned unique identifier 13 is obtained as this first cable identification code represents the cable ends trying to be found. Then all following cable identification codes that are obtained from subsequent scans of unique identifiers 13 in Step 13 while in the "find" mode are compared against this first cable identification code and given a PASS status when the subsequently obtained cable identification code matches the first cable identification code, and a FAIL status when the subsequently scanned unique identifier 13 does not match the first unique identifier 13.

Step 13: Scan subsequent unique identifier 13 at a second end of the cable 10 (i.e., second location) to obtain the cable identification code for the unknown cable end at the second location. While in this "find" mode, each of the cable identification codes that are obtained from the scanning of subsequent unique identifier 13 at the second location are compared against the first cable identification code and given a PASS status when the subsequently obtained cable identification code matches the first cable identification code, and a FAIL status when the subsequently obtained cable identification code does not match the first cable identification code. The status may be reported to the user via display onto the "find" mode GUI displayed on the display 24.

As previously noted, in each of the "scan" mode 40, "scan and verify" mode 50, and "find" mode 60, the cable management tool may also be configured to generate reports detailing the cable installation locations. Such results can also be saved, exported, and/or transmitted as desired, such as to a remote user or remote location, a data storage medium such as cloud storage (which may comprise a database), an excel spreadsheet, or a comma separated values file for import into other management systems. The GUI shown in FIG. 14 includes a save button 61 and an export button 62 to implement these respective functions. The cable management tool may also be configured to provide an option for the user to save and move on, or save and quit, after each scan and/or after each time new data is input to the lookup table storing the cable information.

Figure 15:
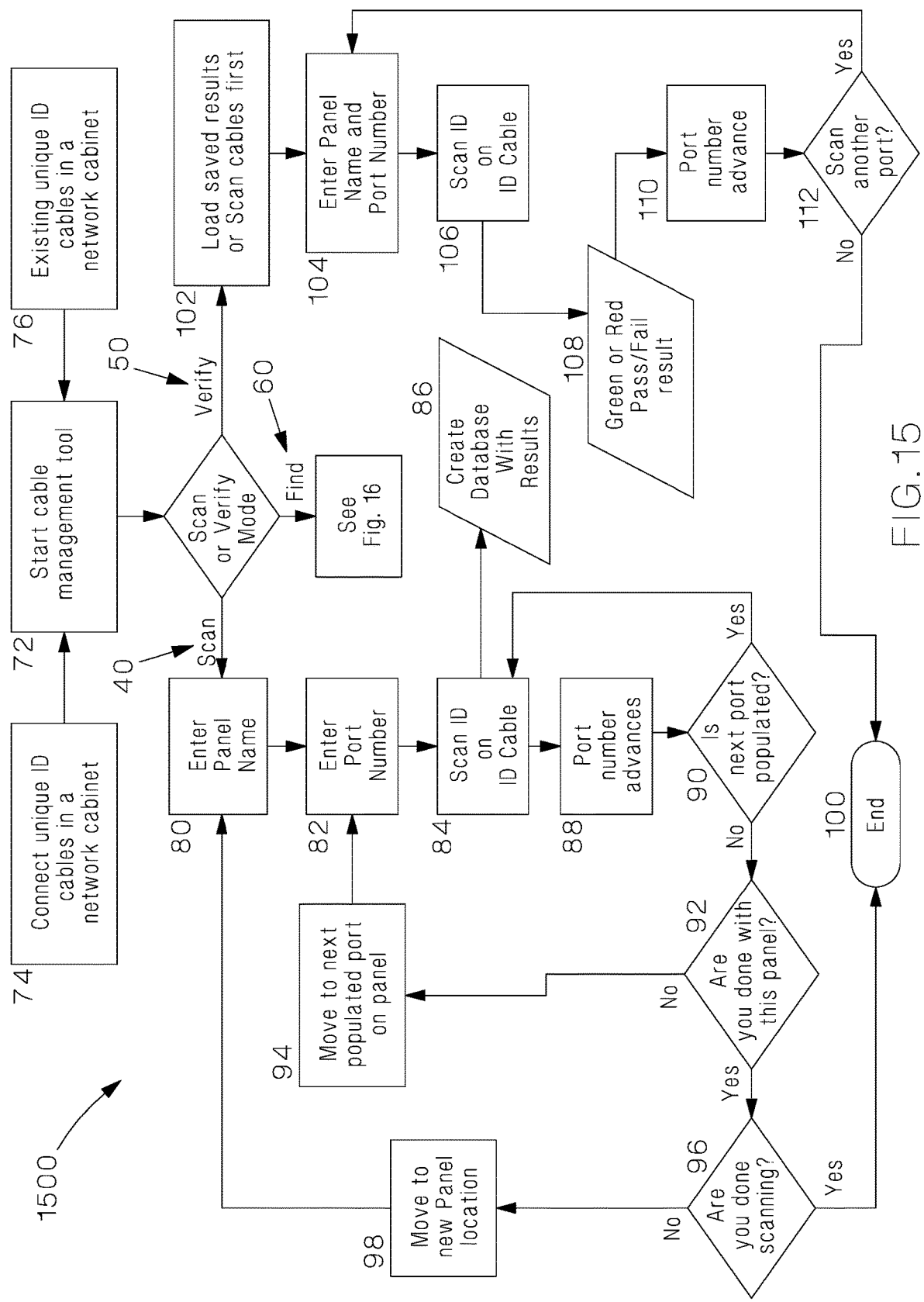
FIG. 15 shows a logic flowchart describing a process for a "scan" mode and a "scan and verify" mode implemented using the cable management tool, according to a non-limiting exemplary embodiment of the present disclosure.

FIG. 15 is a logic flowchart 1500 describing a process implemented by the cable management tool for the "scan" mode 40 and the "scan and verify" mode 50 described herein, according to a non-limiting exemplary embodiment of the present disclosure. As shown, the cable management tool may start execution based on two scenarios (72): first, a new installation environment where unique ID cables have not yet been fully installed (74); or second, a previously installed environment where unique ID cables have already been partially, or fully, installed (76). Upon starting execution of the cable management tool (72), the cable management tool may enter the "scan" mode 40, the "scan and verify" mode 50, or the "find" mode 60.

As previously described and shown in the flowchart 1500, the "scan" mode 40 proceeds with the cable management tool receiving panel name information (80) and port number information (82). For example, the panel name information and/or port number information may be entered into their respective fields in the GUI via an input device (e.g., keyboard or touchscreen), or in some embodiments received from another data source.

Thereafter the unique identifier on the current cable is scanned (84), where the information obtained from scanning the unique identifier may be used to create or add to a database (86). For example, the cable management tool obtains a cable identification code based on the scanned unique identifier and creates a database entry for the cable under the obtained cable identification code. Then, the database stores corresponding cable information to associate with the database entry for the cable identification code. Such cable information may include or more of cable ends installation location, cable production data, and/or other cable attribute information that is accessed based on the cable identification code. Thus, the database becomes an effective and efficient store of relevant information for an installer to access as it identifies the cables used in the installation and associates them to their corresponding cable information. The database may be constructed as, for example, a lookup table format.

After such scanning (84), the port number is automatically incremented (88), and the cable management tool comes to a decision point where a determination is made as to whether the next port number is, or will be, populated with a cable (90). If so, the cable management tool goes through the looped process of scanning the unique identifier of the next cable to obtain the cable identification code of the next cable (84), adding the next cable's identification code to the database as well as accessing any known cable information to the database entry (86), and automatically incrementing the port number (88). Otherwise, the cable management tool determines whether all cables associated with the current panel have been scanned (92). If not, then the process for the "scan" mode 40 moves to the next port populated with a cable on the current panel (94). Otherwise, the cable management tool determines whether all scanning has been completed for additional panels (96). If there are additional panels left for scanning, then the process for the "scan" mode 40 moves to a new panel (98). Otherwise, when there are no more panels for scanning the process for the "scan" mode 40 ends (100).

As also previously described, the "scan and verify" mode 50 may proceed with loading saved result for scanned cables from a database (102). The saved results may be obtained from a previous iteration of the "scan" mode, or previously downloaded cable installation results. Panel name information and port number information is then entered into the cable management tool and/or received by the cable management tool (104).

Thereafter, a unique identifier of a current cable is scanned (106), and a PASS/FAIL result is reported by the cable management tool based on whether the location (panel name and port number information) entered and/or received for the current cable's unique identifier matches the previously stored location for that cable, where the cable is identified based on its scanned unique identifier (108). The port number may then be automatically incremented (110), and the cable management tool determines whether another cable unique identifier is to be scanned to perform another "scan and verify" operation (112). If there are additional cables to be verified, the process for the "scan and verify" mode 50 is repeated by looping back to entering/receiving the panel name information and port number information for the next cable being verified (104). Otherwise, the process for the "scan and verify" mode 50 ends (100).

Figure 16:
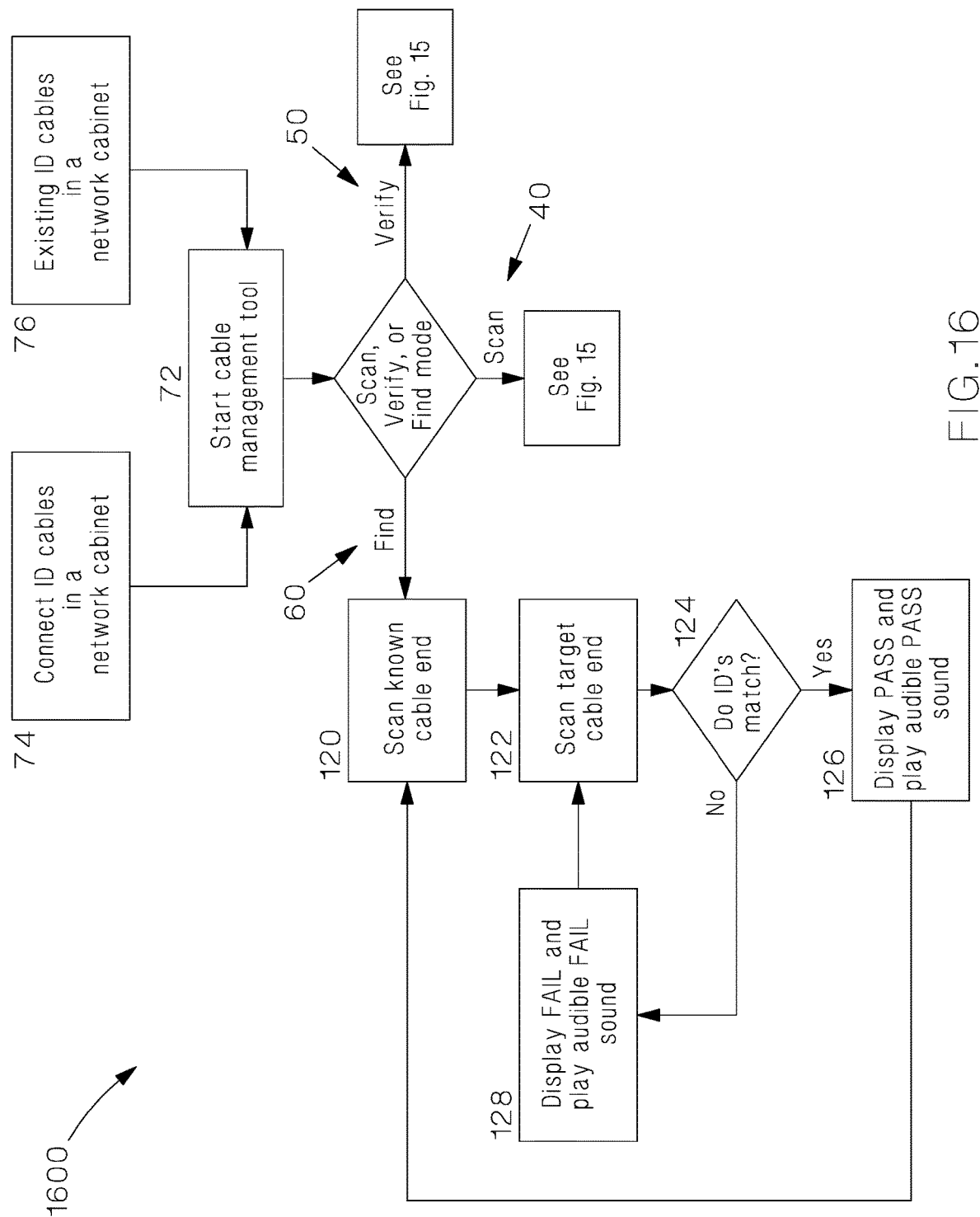
FIG. 16 shows a logic flowchart describing a process for a "find" mode implemented using the cable management tool, according to a non-limiting exemplary embodiment of the present disclosure.

FIG. 16 is a logic flowchart 1600 describing a process implemented by the cable management tool for a "find" mode 60, according to a non-limiting exemplary embodiment of the present disclosure. Once again, as seen therein, the cable management tool may initially start execution based on two scenarios (72): first, a new installation environment where unique ID cables have not yet been fully installed (74); or second, a previously installed environment where unique ID cables have already been partially, or fully, installed (76). Upon starting execution of the cable management tool (72), the cable management tool may enter the "scan" mode 40, the "scan and verify" mode 50, or the "find" mode 60.

As previously described, the cable management tool implements the "find" mode 60 by identifying a first cable end from scanning the unique identifier at a first location (120). By scanning the unique identifier, the cable management tool looks up the corresponding cable identification code to establish as the first cable end, with the intention of finding the corresponding second cable end using the "find" mode 60.

Thereafter, the user travels to a second location to begin scanning unique identifiers off of cable ends found at the second location in an effort to find the matching second cable end. So, at this second location, the unique identifier off a target cable end is scanned and the cable management tool identifies the cable identification code for the target cable end (122). Then the cable identification codes for the first cable end and the target cable end are compared to see if they match (124). A match may identify the same cable identification code with their respective location code (e.g., 10000090A and 10000090B).

If the cable management tool determines there is a match, a PASS status is reported (126), such as via the display of the mobile computing device and/or via a first audible tone emitted by the mobile computing device 20. If the cable management tool determines there is not a match, then a FAIL status is reported (128), such as via the display of the mobile computing device and/or via a second audible tone different than the first audible tone emitted by the mobile computing device.

When the cable management tool reports the FAIL status, the unique identifier at a different target cable end at the second location is scanned to continue the search for the other end to the first cable end (122). This looping process may continue until a match is found to present the PASS status (126), or until the user exits the "find" mode.

Figure 17:
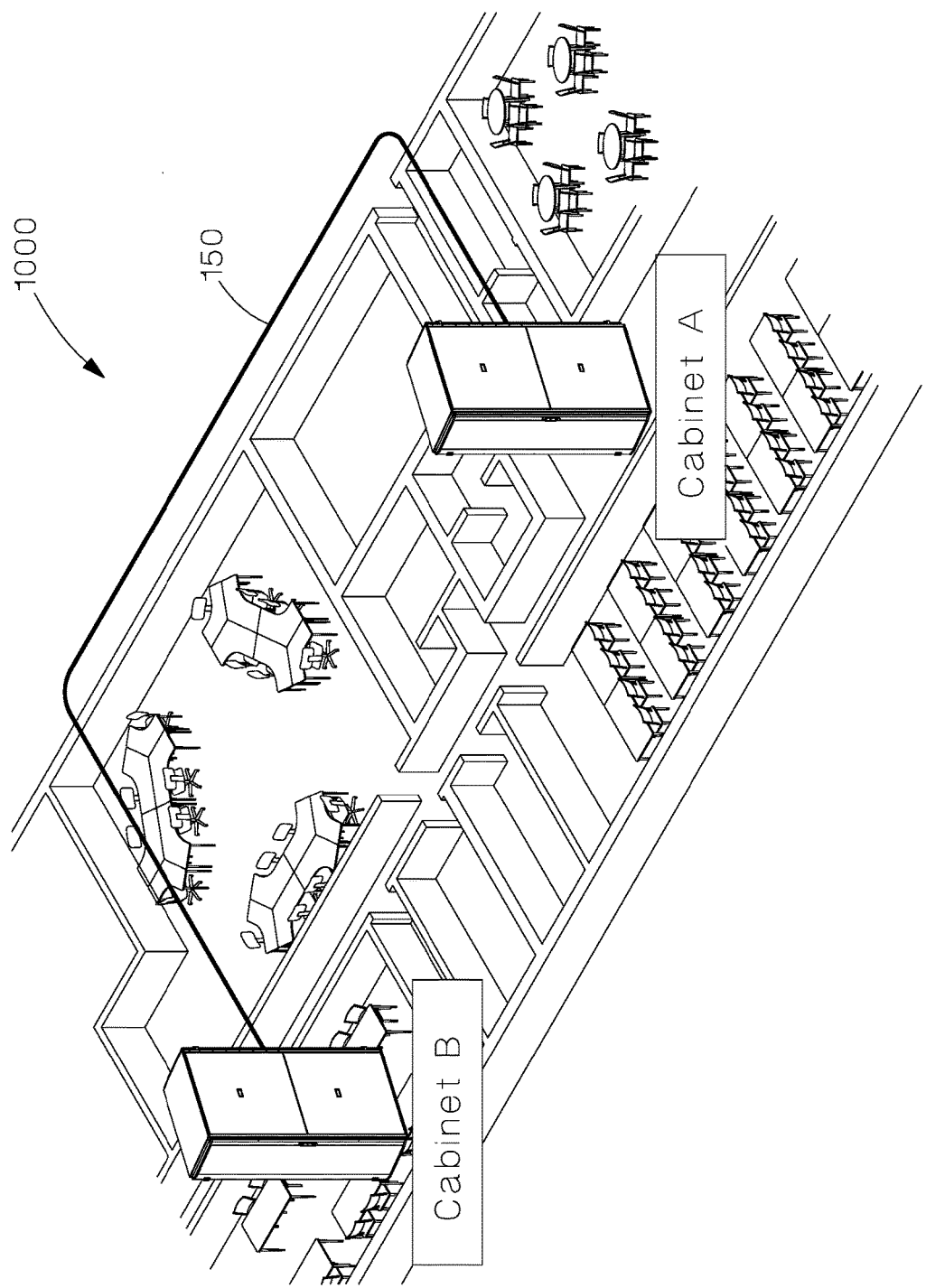
FIG. 17 shows a structured cabling system installed in an environment where the cable management tool is being executed, according to a non-limiting exemplary embodiment of the present disclosure.

FIG. 17 shows an exemplary structured cabling system 1000 where a first cabinet (e.g., Cabinet A) is located a distance away from a second cabinet (e.g., Cabinet B) and connected using bulk cable. A cable 150 is used to connect connector panels (e.g., modular patch panels or fiber enclosure trays) mounted in cabinet A to connector panels mounted in cabinet A in a one-to-one manner. In this structured cabling system 1000, cabinet A and cabinet B are directed connected in a one-to-one manner using one or more cable runs of the cable 150 that are mounted between the connector panels installed into the respective cabinet A and cabinet B. According to the structured cabling system 1000, the cable 150 may be representative of one or more distinct runs of the same type of cable.

In the one-to-one wiring method as shown in the structured cabling system 1000, port No. 1 on a patch panel or fiber enclosure in cabinet A will be cabled to port No. 1 in the corresponding patch panel or fiber enclosure in cabinet B. So during an installation process the installer is tasked with keeping track of the cable 150 to ensure it is the proper cable to being routed to the correct ports. In past implementations, the installers may have installed temporary labels onto the cable 150 to help with identification during the cable pulling process. However, in situations where the cable 150 is not labelled with pulling labels, or pulling labels are dislodged in the installation process, additional time must be spent troubleshooting and identifying the cable 150 to install them in the proper corresponding positions.

Besides pulling cable and terminating connectors on cable ends, the system installer may also provide documentation of pulled cables to a customer. Structured cabling is used to connect two endpoints in different locations, and therefore documentation of structured cabling focuses on to and from locations, specifically information that describes which port a first cable end is from (one terminated end of the cable or near end) to which port a second cable end to the same cable is going (other terminated end of the same cable or far end).

Figure 18:
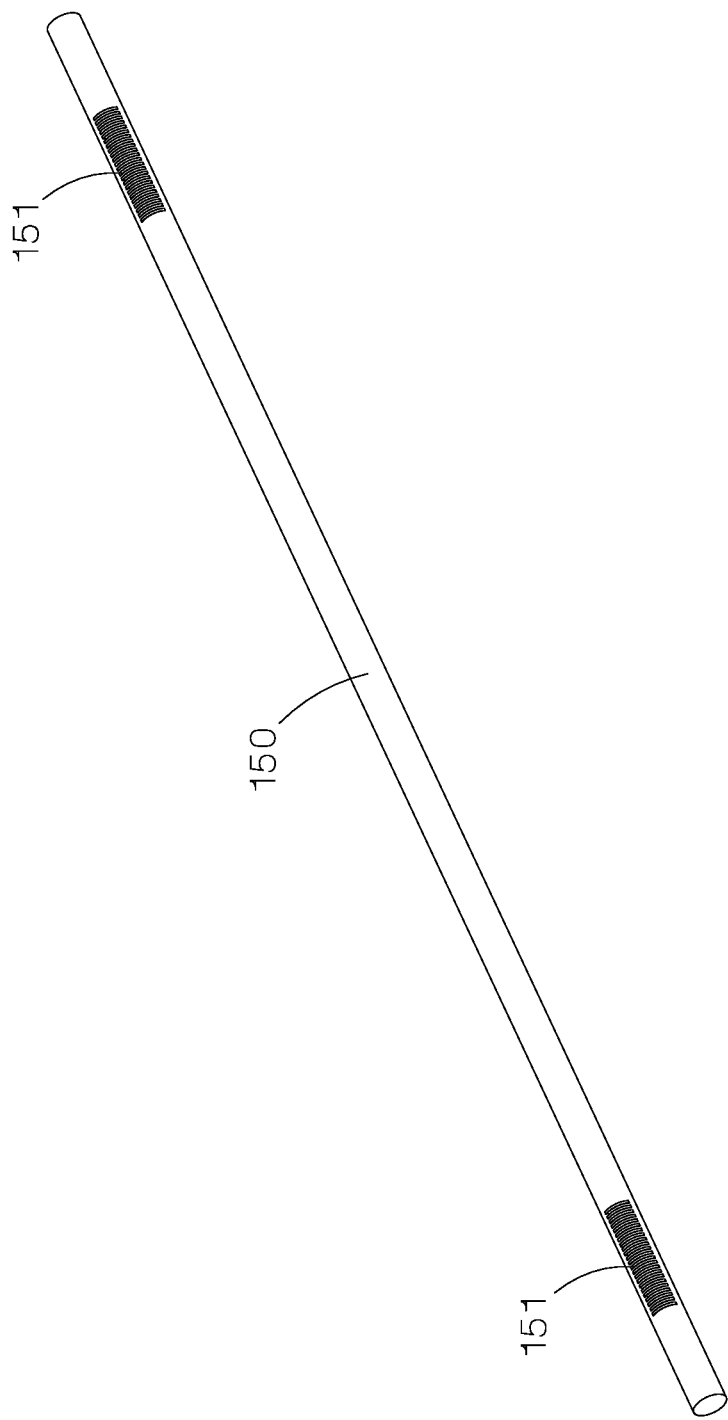
FIG. 18 shows a cable with unique identifiers pre-printed at predetermined intervals on an outer layer of the cable according to one non-limiting exemplary embodiment of the present disclosure.

In an effort to aid in the management of the cable 150 used in the structed cabling system 1000, the cable 150 itself is a bulk cable having pre-printed unique identifiers 151 placed directly on the cable jacket at predetermined intervals as it is manufactured and wound onto a cable spool prior to installation, as shown in FIG. 18. The unique identifiers 151 may be a multi-part barcode that includes a unique number identifying each individual spool of cable and may also include a distance marker that indicates the distance of cable unwound from the spool, as well as other descriptive information. The unique identifiers 151 are described herein as being barcodes for exemplary purposes, although other types of unique identifiers may be used (e.g., machine-readable codes such as QR codes, or unique alpha-numeric code for image recognition).

FIG. 18 shows a partial view of the cable 150 that includes two instances of the unique identifier 151 spaced apart by a predetermined interval distance. Whereas the unique identifier 13 illustrated in FIG. 2 is printed onto labels 12, the unique identifier 151 shown in FIG. 18 is pre-printed directly onto the cable 150. The unique identifier 151 is printed at locations to be spaced apart by the predetermined interval length (e.g., 12 inches or less, 18 inches or less, 24 inches or less, or another predetermined interval distance). The unique identifier 151 is scanned by the cable management tool to then identify a cable identification code for the cable from which the unique identifier 151 was scanned from. With the cable identification code, the cable management tool may further obtain cable production data such as, but not limited to, cable manufacturing information (e.g., cable length, part number, cable type), quality control data, country of origin, production date, material lot number, category of cable, plenum or LSZH material confirmation, test result data such as insertion loss, crosstalk, DC resistance, or other information known about the cable (hereinafter collectively referred to as the cable information). While in some embodiments the cable information may be stored on the mobile computing device 20 as part of the cable management tool, according to other embodiments the cable management tool communication with a remote server, via APIs, to access and download the cable information.

In addition, or alternatively, according to some embodiments the cable 150 may further include one or more labels that include the unique identifier 151 or other information (e.g., cable information). The label may be attached near one or both of the cable ends, similar to the labels 12 described in FIG. 2. The labels may be attached at a position that is at the predetermined distance from the cable end it is attached nearest to, or further away from.

Figure 19:
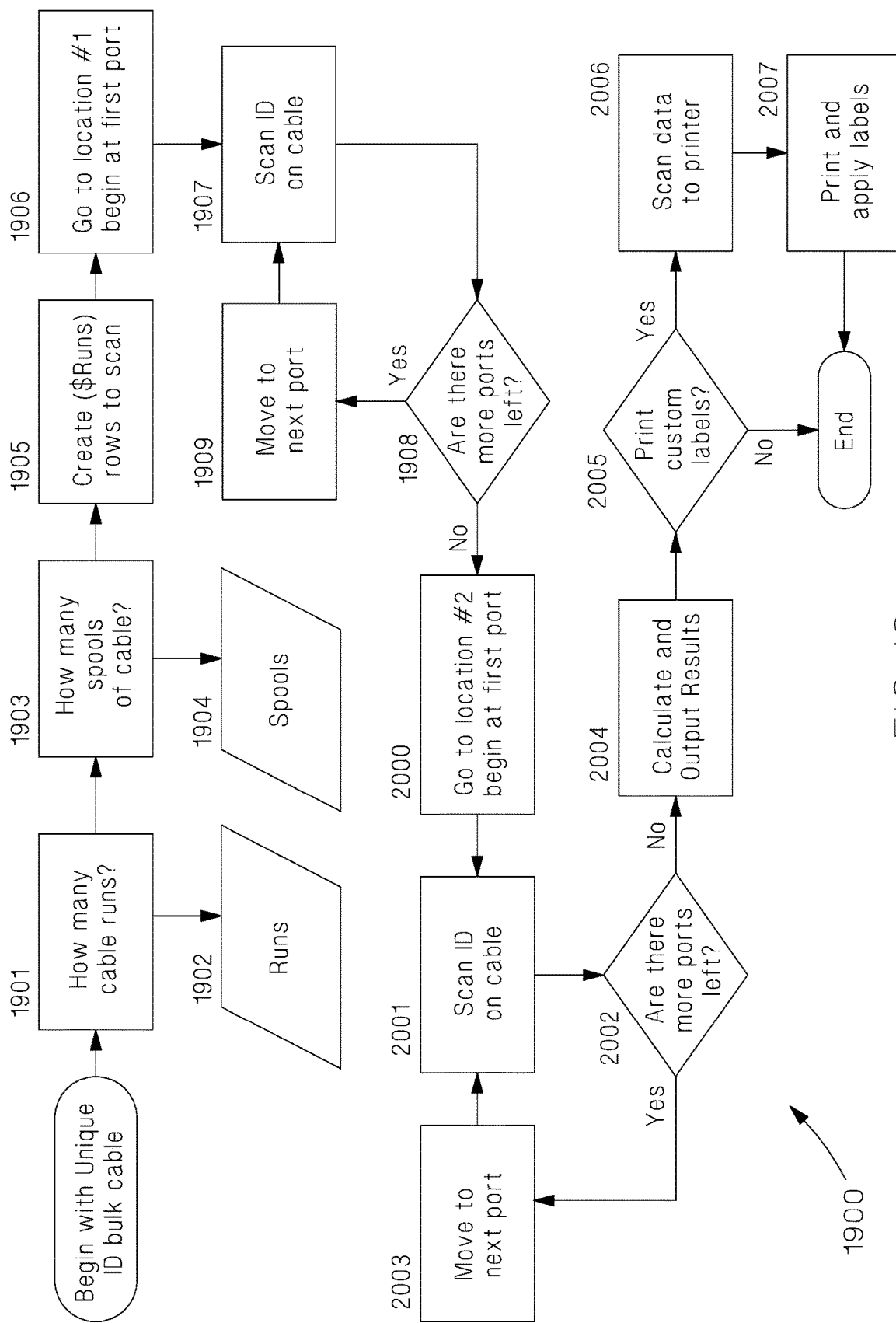
FIG. 19 shows a logic flowchart describing an exemplary installation process implemented by the cable management tool using the cable illustrated in FIG. 18.

The cable 150 may be used in the cable management system 200, where the unique identifiers 151 are scanned by the barcode scanner 30 to obtain the corresponding information from the unique identifiers 151. The barcode scanner 30 may then similarly transmit the scanned information to the mobile computing device 20 executing the cable management tool for the cable management tool to obtain cable identification codes and/or other cable information using the scanned information. For example, a process for identifying the cable runs during a bulk cable installation process in the structured cabling system 1000 may be implemented, at least in part, by the cable management tool according to the processes described in flowchart 1900 shown in FIG. 19.

According to a first step in the flowchart 1900, an inventory of the number of cable runs needed for the installation is accounted for by determining how many cable runs will be used in the current installation (1901). This step may also include assigning a unique identification code to the cable runs and inputting the unique identification codes into the cable management tool. Then the installer may physically pull the number of cable runs needed (1902).

As each cable run may come from its own individual cable spool, next an inventory of the spools that are being used to pull the cable from is accounted for by identifying the cable spools from which the cable runs will be pulled from (1903). This step may also include inputting the identification of the cable spools into the cable management tool (1904).

Next, the cable management tool is updated to create a lookup table that includes a data insertion row for each of the cable runs that have been identified for this current installation, and associating each cable run to their unique identification code and cable information such as, for example, its origination spool information (1905).

Next, the installer moves to a first location and inserts a first cable end into a first port at the first location (1906). After this insertion step, the installer inputs the name of the port where the cable end has been installed into the cable management tool and uses the barcode scanner 30 to scan the unique identifier 151 of the cable. The scanned information is received by the cable management tool running on the mobile device 20 to auto-populate the cable information into the table and assign it to the appropriate port where the first cable end has been installed within the table (1907). For example, the installer may manually enter the patch panel and port information where the cable end was mounted into the cable management application tool (i.e. name=RoomA–panelA, port=01) and then scan the unique identifier 151 located near the terminated cable so that the corresponding cable identification code and/or cable information is auto-populated into the cable management application tool (e.g., the table) as being associated with the manually input patch panel and port location.

The cable management tool then determines whether there are additional cable ends to inset into remaining ports at the first location (1908). If the cable management tool determines additional cable ends are left for inserting into remaining ports, then the additional cable ends are inserted into the remaining ports (1909), while also similarly scanning the unique identifiers as the cable ends are installed into their respective ports (1907). This way, the cable management tool receives the correct identification information for assigning the proper cables to their mounted port location at the first location. This looped process is continued until no more cables are left for installation at the first location.

When no further cables ends are left for mounting into ports at the first location, the installer moves to a second location where the opposite cable ends are to be inserted into their corresponding ports located at the second location (2000).

Here at the second location, the installer uses the barcode scanner 30 to scan the unique identifier 151 of the cable at the second cable end (2001). The cable management tool reads the unique identifier 151 of the cable and identifies the corresponding identification code to obtain the corresponding cable installation location from when it was previously identified and mounted at its port location at the first location. From this identification, the cable management tool displays the port location for where the corresponding first cable end was mounted at the first location. Then with this information the installer determines the intended port mounting location for the second cable end at the second location based on where the first cable end was mounted into the patch panel at the first location (e.g., mirror the mounting positions).

In addition, or alternatively, the cable management tool may have pre-stored information that identifies the intended port mounting location (e.g., not mirrored mounting positions) for the cable at the second location. Then after identifying the cable based on the scanned unique identifier 151, the cable management tool displays the intended port mounting location for the second cable end based on the pre-stored information.

Once installed, the scanned information received by the cable management tool running on the mobile device 20 auto-populates the cable information into the table and assigns it to the appropriate port where the second cable end has been mounted at the second location. Therefore, the cable management tool will have a record for where both the first cable end and the second cable end for the same cable have been mounted for future reference.

The cable management tool determines whether there are additional cable ends to install into remaining ports at the second location (2002). When the cable management tool determines there are cable ends remaining to install into ports at the second location, the remaining cable ends are inserted into the remaining ports until no more cables are left (2003), while scanning the respective unique identifier 151 as the remaining cable ends are being installed (2001). The scanning of the unique identifiers ensures the cable management tool will have a record for where both the first cable end and the second cable end for the same cable have been mounted for future reference. As the second location may be the location where the cable spool is located, the cables may be cut from the spool after being scanned here at the second location.

When all the cable ends have been mounted into their locations and accounted for in the cable management tool, the cable management tool may be executed to run an analysis to ensure the installation has been accomplished correctly (2004). The resulting cable location data (e.g., the table) may be stored locally on the mobile device 20 or transmitted to an offsite storage device (e.g., cloud storage or server computer).

According to some embodiments, custom labels may be created by the installer using, for example, the cable management tool (2005). After creating the custom labels, the custom labels are sent to an on-site portable cable printer for printing (2006). The custom label may then be attached to the intended cable (2007). The custom label may include information not included in the unique identifiers 151. For example, the custom label may include one or more pieces of the cable production data that has been downloaded based on the identification of the cable from the scanned unique identifier 151. The intended cable for receiving the custom label may be located using the information gathered by the cable management application tool.

According to some embodiments, the cable 150 including the unique identifiers 151 that are pre-printed at the predetermined interval on the outer layer may also be used by the cable management tool during implementation of the "scan" mode, the "scan and verify" mode, and/or the "find" mode described herein. In other words, the unique identifiers 151 found on the cable 150 included in the structured cabling system 1000 may be scanned by the barcode scanner 30 to use the scanned information to implement the "scan" mode, the "scan and verify" mode, and/or the "find" mode described herein.

The process described by flowchart 1900 is a more efficient and effective installation process which saves the installer the initial step in traditional installation jobs of creating and pulling labels to apply them to the bulk cable as was needed previously.

So, the installation process in which an installer pulls the cable from one location to another can greatly affect the amount of time spent identifying cables and creating relevant documentation. According to some embodiments, the management application tool may include a digital imaging feature that captures an image of the location (e.g., server room) where the cable management is taking place and include the image along with the generated report in a data file corresponding to the location.

According to some embodiments, the management application tool may save the data files based on a room name to better manage the data files as the cable management projects increase in scale. A database, stored locally on the mobile computing device 20 or remotely at a cloud storage, may also be utilized to store data files and reports generated by the management application tool.

According to some embodiments, the cable management tool may implement a graphical user interface (GUI) that includes an increase (e.g., "+") and/or decrease (e.g., "−") button(s) for easily transitioning to a next, or previous, port and/or panel during any one or more of the processes described herein.

The present disclosure thus describes a cable management device, system, method, and application program comprising a non-transitory computer readable storage medium that solve the problems associated with the known cable management approaches described previously. The cable management device, system, method, and non-transitory computer readable storage medium of the present disclosure provide and/or utilize unique cable identifiers in conjunction with intelligent software that can provide patch field cable documentation without the hassle of manually tracing cables and documenting their location. Once a patch field has been scanned, the cable management device, system, method, and non-transitory computer readable storage medium of the present disclosure can then use saved information to verify or find existing connections.

As is readily apparent from the foregoing, various non-limiting embodiments of a cable management device, system, method, and non-transitory computer readable storage medium have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A machine-readable memory storage device configured to be in communication with a processor, the machine-readable memory storage device comprising:
   processor-executable instructions configured to, when executed by the processor, cause the processor to:
      detect, via a detection device, a first cable identifier located on a first end of a cable;
      detect, via the detection device, a second cable identifier located on a second end of the cable;
      determine whether both the first cable identifier and the second cable identifier correspond to the same cable;
      when the first cable identifier and the second cable identifier are determined to correspond to the same cable, control output of a notification indicating a pass status; and
      when the first cable identifier and the second cable identifier are determined to not correspond to the same cable, control output of a notification indicating a fail status.

2. The machine-readable memory storage device of claim 1, wherein the first cable identifier is located at a predetermined location measured from an end of the cable.

3. The machine-readable memory storage device of claim 1, wherein the first cable identifier is located at predetermined intervals on the cable of 18 inches or less.

4. The machine-readable memory storage device of claim 1, further comprising processor-executable instructions configured to, when executed by the processor, cause the processor to:
generate label information corresponding to the cable; and
transmit the label information to a printer for printing the label information onto a label.

5. The machine-readable memory storage device of claim 1, wherein the first cable identifier is used to identify at least one of cable attribute information, cable spool information, cable length information, or cable production data.

6. The machine-readable memory storage device of claim 1, further comprising processor-executable instructions configured to, when executed by the processor, cause the processor to:
communicate, via a network interface, with a remote computing device; and
receive, via the network interface, information corresponding to the cable from the remote computing device.

7. The machine-readable memory storage device of claim 1, wherein the first cable identifier is a barcode, QR code, or other machine-readable code.

8. The machine-readable memory storage device of claim 1, wherein the first cable identifier is detected by the detection device via image recognition.

9. A mobile computing device comprising:
a processor; and
a machine-readable memory storage device configured to be in communication with the processor, the machine-readable memory storage device storing processor-executable instructions configured to, when executed by the processor, cause the processor to:
detect, via a detection device, a first cable identifier located on a first end of a cable;
detect, via the detection device, a second cable identifier located on a second end of the cable;
determine whether both the first cable identifier and the second cable identifier correspond to the same cable;
when the first cable identifier and the second cable identifier are determined to correspond to the same cable, control output of a notification indicating a pass status; and
when the first cable identifier and the second cable identifier are determined to not correspond to the same cable, control output of a notification indicating a fail status.

10. The mobile computing device of claim 9, wherein the first cable identifier is located at a predetermined location measured from an end of the cable.

11. The mobile computing device of claim 9, wherein the first cable identifier is located at predetermined intervals on the cable of 18 inches or less.

12. The mobile computing device of claim 9, the machine-readable memory storage device further storing processor-executable instructions configured to, when executed by the processor, cause the processor to:
generate label information corresponding to the cable; and
transmit the label information to a printer for printing the label information onto a label.

13. The mobile computing device of claim 9, wherein the first cable identifier is used to identify at least one of cable attribute information, cable spool information, cable length information, or cable production data.

14. The mobile computing device of claim 9, the machine-readable memory storage device further storing processor-executable instructions configured to, when executed by the processor, cause the processor to:
communicate, via a network interface, with a remote computing device; and
receive, via the network interface, information corresponding to the cable from the remote computing device.

15. The mobile computing device of claim 9, wherein the first cable identifier is a barcode, QR code, or other machine-readable code.

16. The mobile computing device of claim 9, wherein the first cable identifier is detected by the detection device via image recognition.

17. A method for managing a cable installed in a cabling system, the method comprising:
detecting, via a detection device, a first cable identifier located on a first end of a cable;
detecting, via the detection device, a second cable identifier located on a second end of the cable;
determining whether both the first cable identifier and the second cable identifier correspond to the same cable;
when the first cable identifier and the second cable identifier are determined to correspond to the same cable, controlling output of a notification indicating a pass status; and
when the first cable identifier and the second cable identifier are determined to not correspond to the same cable, controlling output of a notification indicating a fail status.

18. The method of claim 17, wherein the first cable identifier is located at a predetermined location measured from an end of the cable.

19. The method of claim 17, wherein the first cable identifier is a barcode, QR code, or other machine-readable code.

20. The method of claim 17, wherein detecting the first cable identifier comprises the detection device utilizing image recognition to detect the first cable identifier.

* * * * *